(12) United States Patent
Yuille et al.

(10) Patent No.: US 12,738,026 B2
(45) Date of Patent: Sep. 15, 2026

(54) SYSTEMS, METHODS, AND COMPUTER PROGRAMS FOR USING A NETWORK OF MACHINE LEARNING MODELS TO DETECT AN IMAGE DEPICTING AN OBJECT OF INTEREST WHICH CAN BE PARTIALLY OCCLUDED BY ANOTHER OBJECT

(71) Applicant: The Johns Hopkins University, Baltimore, MD (US)

(72) Inventors: Alan Yuille, Baltimore, MD (US); Adam Kortylewski, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 118 days.

(21) Appl. No.: 18/570,325

(22) PCT Filed: Jun. 14, 2022

(86) PCT No.: PCT/US2022/033438
§ 371 (c)(1),
(2) Date: Dec. 14, 2023

(87) PCT Pub. No.: WO2022/266101
PCT Pub. Date: Dec. 22, 2022

(65) Prior Publication Data

US 2024/0290075 A1 Aug. 29, 2024

Related U.S. Application Data

(60) Provisional application No. 63/210,350, filed on Jun. 14, 2021.

(51) Int. Cl.

| | |
|---|---|
| ***G06K 9/00*** | (2022.01) |
| ***G06T 7/73*** | (2017.01) |

(Continued)

(52) U.S. Cl.
CPC ........... *G06V 10/7715* (2022.01); *G06T 7/74* (2017.01); *G06V 10/40* (2022.01); *G06V 10/764* (2022.01);
(Continued)

(58) Field of Classification Search
CPC .... G06N 3/045; G06N 3/0464; G06N 3/0475; G06N 3/048; G06N 3/088;
(Continued)

(56) References Cited

U.S. PATENT DOCUMENTS

| | | | |
|---|---|---|---|
| 9,739,783 | B1 | 8/2017 | Kumar et al. |
| 9,811,906 | B1 | 11/2017 | Vizitiu et al. |

(Continued)

FOREIGN PATENT DOCUMENTS

| | | |
|---|---|---|
| CN | 109685809 | 4/2019 |
| EP | 3252671 | 5/2016 |

(Continued)

OTHER PUBLICATIONS

Abraham et al., "Extracting Brain Regions from Rest fMRI with Total-Variation Constrained Dictionary Learning,"MICCAI., 2013, 16:2:607-15.

(Continued)

*Primary Examiner* — Hadi Akhavannik
(74) *Attorney, Agent, or Firm* — Fish & Richardson P.C.

(57) ABSTRACT

Methods, systems, and apparatus, including computer programs encoded on computer-storage media, used for object detection in an input image that can include at least partial object occlusion. In some implementations, input data representing the image depicting an object can include object-based features and context-based features used for object detection. The feature is processed by a deep convolutional neural network (DCNN) model. First feature data generated by the DCNN is provided to an occlusion model and a (Continued)

generative compositional model. The occlusion model can detect locations where an object depicted in the image is occluded by an object of any other type. The generative compositional model detects the presence of different classes of objects that represent parts or partial components of object depicted in the image. The output of the compositional model and occlusion model is a likelihood map that shows if an object is depicted in the input image.

18 Claims, 10 Drawing Sheets

(51) Int. Cl.
*G06V 10/40* (2022.01)
*G06V 10/764* (2022.01)
*G06V 10/77* (2022.01)
*G06V 10/82* (2022.01)

(52) U.S. Cl.
CPC .... *G06V 10/82* (2022.01); *G06T 2207/20081* (2013.01); *G06T 2207/20084* (2013.01)

(58) Field of Classification Search
CPC . G06T 2207/20081; G06T 2207/20084; G06T 7/74; G06V 10/25; G06V 10/40; G06V 10/764; G06V 10/7715; G06V 10/82; G06V 20/54
See application file for complete search history.

(56) References Cited

U.S. PATENT DOCUMENTS

| | | | |
|---|---|---|---|
| 9,947,102 | B2 | 4/2018 | Xu et al. |
| 9,965,863 | B2 | 5/2018 | Xu et al. |
| 10,140,544 | B1 | 11/2018 | Zhao et al. |
| 11,049,250 | B2 | 6/2021 | Nye et al. |
| 11,308,623 | B2 | 4/2022 | Yuille et al. |
| 12,125,211 | B2 | 10/2024 | Yuille et al. |
| 12,141,694 | B2 | 11/2024 | Park et al. |
| 2010/0067754 | A1 | 3/2010 | Collins et al. |
| 2012/0230572 | A1 | 9/2012 | Kohlberger |
| 2015/0003703 | A1 | 1/2015 | Franz et al. |
| 2016/0098833 | A1 | 4/2016 | Tsadok et al. |
| 2017/0249744 | A1 | 8/2017 | Wang et al. |
| 2017/0316578 | A1* | 11/2017 | Fua ......................... G06T 7/246 |
| 2017/0372505 | A1* | 12/2017 | Bhat ......................... G06T 7/73 |
| 2018/0042565 | A1 | 2/2018 | Wilson et al. |
| 2018/0108124 | A1 | 4/2018 | Guo et al. |
| 2018/0165548 | A1* | 6/2018 | Wang ....................... G06N 3/09 |
| 2018/0268202 | A1* | 9/2018 | Yu ......................... G06F 16/743 |
| 2019/0080149 | A1* | 3/2019 | Gernoth ............... G06V 40/166 |
| 2019/0105009 | A1 | 4/2019 | Siemionow et al. |
| 2019/0220975 | A1 | 7/2019 | Hsieh et al. |
| 2019/0258878 | A1 | 8/2019 | Koivisto et al. |
| 2020/0005899 | A1 | 1/2020 | Nicula et al. |
| 2020/0202507 | A1 | 6/2020 | Ceccaldi et al. |
| 2020/0245960 | A1 | 8/2020 | Richter et al. |
| 2020/0278681 | A1 | 9/2020 | Gier et al. |
| 2020/0342600 | A1 | 10/2020 | Sjostrand et al. |
| 2020/0356899 | A1 | 11/2020 | Rejeb Sfar et al. |
| 2020/0372626 | A1* | 11/2020 | Dal Mutto .............. G06T 17/00 |
| 2021/0012505 | A1 | 1/2021 | Yuille et al. |
| 2022/0215646 | A1 | 7/2022 | Park et al. |
| 2022/0277459 | A1 | 9/2022 | Yuille et al. |
| 2022/0392641 | A1 | 12/2022 | Yuille et al. |

FOREIGN PATENT DOCUMENTS

| | | |
|---|---|---|
| EP | 3392832 | 10/2018 |
| WO | WO 2016182551 | 11/2016 |
| WO | WO 2017210690 | 12/2017 |
| WO | WO 2018015080 | 1/2018 |
| WO | WO 2018015414 | 1/2018 |
| WO | WO 2019005722 | 1/2019 |

OTHER PUBLICATIONS

Ansari et al. "Role of Magnetic Resonance Imaging in the Detection and Characterization of Solid Pancreatic Nodules: An Update," World Journal of Radiology, 28, 7(11), Nov. 2015, 361-374.
Arthur et al., "k-means++: The advantages of careful seeding," Proceedings of the Eighteenth Annual ACM-SIAM Symposium on Discrete Algorithms, Jan. 2007, 1027-1035.
Asman et al., "Formulating spatially varying performance in the statistical fusion framework," IEEE Trans. on Med, Imaging, 2012, 31:6:1326-1336.
Asman et al., "Non-local statistical label fusion for multi-atlas segmentation," Med. Image Anal., Feb. 2013, 17:2:194-208.
Aydogan et al., "Analysis of Trabecular Bone Microstructure Using Contour Tree Connectivity," MICCAI., 2013, 16:2:428-35.
Banerjee et al., "Clustering on the unit hypersphere using von mises-fisher distributions," Journal of Machine Learning Research, Sep. 2005, 6:1345-1382.
Bienenstock et al., "Compositionality, MDL Priors, and Object Recognition," Proceedings of the 9th International Conference on Neural Information Processing Systems, Dec. 1996, 838-844.
Bieth et al., "Atlas Construction for Dynamic (4D) Pet Using Diffeomorphic Transformations," MICCAI, 2013, 35-42.
Boykov et al, "Fast approximate energy minimization via graph cuts," IEEE Transactions on PAMI, 2001, 23:11:122-1239.
Brosch et al., "Manifold Learning of Brain MRIs by Deep Learning," MICCAI., 2013, 16:2:633-40.
Cai et al., "Cascade R-CNN: Delving into High Quality Object Detection," Proceedings of the IEEE/CVF Conference on Computer Vision and Pattern Recognition (CVPR), Jun. 2018, 6154-6162.
Carlson et al., "A Sparse Object Coding Scheme in Area V4," Current Biology, Feb. 22, 2011, 21(4):288-293.
Cerrolaza et al., "Multiresolution Hierarchical Shape Models in 3D Subcortical Brain Structures," MICCAI., 2013, 16:2:641-8.
Chang et al., "Characterization of Tissue Histopathology via Predictive Sparse Decomposition and Spatial Pyramid Matching," MICCAI, 2013, 8150:91-98.
Chatelain et al., "Learning from Multiple Experts with Random Forests: Application to the Segmentation of the Midbrain in 3D Ultrasound," MICCAI, 2013, 16:2:230-7.
Chen et al., "Attention to scale: Scale-aware semantic image segmentation," In proceedings of the IEEE conf. on CCVPR, 2016, 3640-3649.
Chen et al., "DeepLab: Semantic Image Segmentation with Deep Convolutional Nets, Atrous Convolution, and Fully Connected CRFs", IEEE Transactions on Pattern Analysis and Machine Intelligence, 2016, 40(4): 834-848.
Chen et al., "VoxResNet: Deep voxelwise residual networks for brain segmentation from 3D MR images," NeuroImage, 2018, 170:446-455.
Chu et al., "Multi-organ segmentation based on spatially-divided probabilistic atlas from 3D abdominal CT images," Lecture Notes in Comp. Sci., 2013, 8150LNCS(part 2) 165-172.
Ciompi et al., "Stent Shape Estimation through a Comprehensive Interpretation of Intravascular Ultrasound Images," MICCAI, 2013, 16:2:345-52.
Ciresan et al., "Mitosis Detection in Breast Cancer Histology Images with Deep Neural Networks," MICCAI., 2013, 16:2:411-8.
Cisek et al., "3D U-Net: Learning dense volumetric segmentation from sparse annotation," MICCAI, 2016, 424-432.
Cruz-Roa et al., "A Deep Learning Architecture for Image Representation, Visual Interpretability and Automated Basal-Cell Carcinoma Cancer Detection," MICCAI., 2013, 16:2:403-10.
Da Mota et al., "Enhancing the Reproducibility of Group Analysis with Randomized Brain Parcellations," MICCAI., 2013, 16:2:591-8.

(56) References Cited

OTHER PUBLICATIONS

Dai et al., "Unsupervised learning of dictionaries of hierarchical compositional models," Proceedings of the IEEE Conference on Computer Vision and Pattern Recognition, Jun. 2014, 2505-2512.
Datar et al., "Geodesic Distances to Landmarks for Dense Correspondence on Ensembles of Complex Shapes," MICCAI., 2013, 16:19-26.
De Silva et al., "Improving 2D-3D Registration Optimization Using Learned Prostate Motion Data," MICCAI, 2013, 16:2:124-31.
Deng et al., "ImageNet: A Large-Scale Hierarchical Image Database," Proceedings of the IEEE Conference on Computer Vision and Pattern Recognition, Jun. 2009, 248-255.
DeVries et al., "Improved regularization of convolutional neural networks with cutout," CoRR, submitted on Nov. 29, 2017, arXiv:1708.04552v2, 8 pages.
Dinse et al., "A Histology-Based Model of Quantitative TI Contrast for In-vivo Cortical Parcellation of High-Resolution 7 Tesla Brain MR Images," MICCAI, 2013, 16(Pt 2):51-58.
Dou et al., "3D deeply supervised network for automatic liver segmentation from CT volumes," Med. Image Analysis, Oct. 2017, 41:40-54.
Dou et al., "Multilevel Contextual 3-D CNNs for False Positive Reduction in Pulmonary Nodule Detection", IEEE Tbe, 2017, 64(7): 1558-1567.
Durichen et al., "Respiratory Motion Compensation with Relevance Vector Machines," MICCAI., 2013, 108-115.
Everingham et al., The PASCAL visual object classes challenge 2012 (VOC2012) results. 2012, Pascal2, 24 pages.
Extended Search Report in European Appln. No. 20794854.8, dated Apr. 19, 2023, 5 pages.
Farag et al., "Automatic pancreas segmentation using coarse to-fine superpixel labeling," Deep learning and Convolutional Neural Networks for Medical Computing, 2017, 24 pages.
Fawzi et al., "Measuring the effect of nuisance variables on classifiers," Proceedings of the British Machine Vision Conference (BMVC), Sep. 2016, 12 pages.
Fidler et al., "Learning a hierarchical compositional shape vocabulary for multiclass object representation," CoRR, submitted on Aug. 23, 2014, arXiv:1408.5516v1, 17 pages.
Fodor et al., "Connectionism and cognitive architecture: A critical analysis," Cognition, Mar. 1988, 28(1-2):3-71.
Forman et al., "Free-Breathing Whole-Heart Coronary MRA: Motion Compensation Integrated into 3D Cartesian Compressed Sensing Reconstruction," MICCAI., 2013, 16:2:575-82.
Gao et al., "Incremental Learning with Selective Memory (ILSM): Towards Fast Prostate Localization for Image Guided Radiotherapy," MICCAI., 2013, 16:2:378-386.
George et al., "A generative vision model that trains with high data efficiency and breaks text-based captchas," Science, Oct. 26, 2017, 358(6368):eaag2612, 19 pages.
Gibson et al., "Automatic multi-organ segmentation on abdominal CT with dense V-networks," IEEE Trans. Med. Imaging, Aug. 2018, 37:8:1822-1834.
Ginsburg et al., "Variable Importance in Nonlinear Kernels (VINK): Classification of Digitized Histopathology," MICCAI., 2013, 16:2:238-45.
Girshick et al., "Rich feature hierarchies for accurate object detection and semantic segmentation," Proceedings of the IEEE Conference on Computer Vision and Pattern Recognition (CVPR), Jun. 2014, 580-587.
Girshick, "Fast R-CNN," Proceedings of the IEEE International Conference on Computer Vision (ICCV), Dec. 2015, 1440-1448.
Glocker et al., "Vertebrae Localization in Pathological Spine CT via Dense Classification from Sparse Annotations," MICCAI., 2013, 16:2:262-70.
Gomez et al., "3D Intraventricular Flow Mapping from Colour Doppler Images and Wall Motion," MICCAI,2013, 16:2:476-83.
Grbic et al., "Image-Based Computational Models for TAVI Planning: From CT Images to Implant Deployment," MICCAI., 2013, 16:2:395-402.
Hacihaliloglu et al., "Statistical Shape Model to 3D Ultrasound Registration for Spine Interventions Using Enhanced Local Phase Features," MICCAI., 2013, 16:2:361-8.
Hamy et al., "Respiratory Motion Correction in Dynamic-MRI: Application to Small Bowel Motility Quantification during Free Breathing," MICCAI, 2013, 16:2:132-40.
Havaei et al.," Brain tumor segmentation with deep neural networks," Medical Image analysis, Jan. 2017, 35:18-31.
He et al., "Deep Residual Learning for Image Recognition", 2016, CVPR, 770-778.
Heimann et al., "Comparison and evaluation of methods for live segmentation from CT datasets," IEEE Transactions on Medical Imaging, Aug. 2009, 28:8:1251-1265.
Hibar er al., "Genetic Clustering on the Hippocampal Surface for Genome-Wide Association Studies," MICCAI., 2013, 16:2:690-7.
Hu et al. "Brain Tumor Segmentation Using Multi-Cascaded Convolutional Neural Networks and Conditional Random Field," IEEE Access, Jul. 8, 2019, 7:92615- 92629.
Hu et al., "Automated Separation of Binary Overlapping Trees in Low-Contrast Color Retinal Images," MICCAI., 2013, 16:2:436-43.
Huang et al., "A New Sparse Simplex Model for Brain Anatomical and Genetic Network Analysis," MICCAI., 2013, 16:2:625-632.
Huh et al, "Apoptosis Detection for Non-adherent Cells in Time-lapse Phase Contrast Microscopy," MICCAI, 2013, 8150: 59-66.
Hussein et al., "Lung and Pancreatic Tumor Characterization in the Deep Learning Era: Novel Supervised and Unsupervised Learning Approaches", IEEE Transactions on Medical Imaging, 2019, 38(8): 1777-1787.
Hussein et al., "Supervised and unsupervised tumor characterization in the deep learning era," ArXiv, 2018, 11 pages.
Iglesias et al., Multi-atlas segmentation of biomedical images: A survey, Med Image Anal., Aug. 2015, 24:1:205-219.
Imani et al., "Ultrasound-Based Characterization of Prostate Cancer: An in vivo Clinical Feasibility Study," MICAAI, 2013, 16:2:279-86.
International Preliminary Report on Patentability in Appl. No. PCT/US2020/029631, dated Sep. 28, 2021, 6 pages.
International Preliminary Report on Patentability in International Application No. PCT/US2020/060061, mailed on May 27, 2022, 9 pages.
International Preliminary Report on Patentability in International Appln. No. PCT/US2022/033438, mailed on Dec. 28, 2023, 9 pages.
International Search Report and Written Opinion in International Application No. PCT/US2020/060061, mailed on Mar. 1, 2021, 14 pages.
International Search Report and Written Opinion in International Appln. No. PCT/US2022/033438, mailed on Oct. 20, 2022, 10 pages.
International Search Report in Appl. No. PCT/US2020/029631, dated Jul. 30, 2020, 6 pages.
Jiang et al., "Predictive Models of Resting State Networks for Assessment of Altered Functional Connectivity in MCI," MICCAI, 2013, 16:2:674-81.
Jimenez del Toro et al., "Epileptogenic Lesion Quantification in MRI Using Contralateral 3D Texture Comparisons," MICCAI., 2013, 16:2:353-60.
Jin et al., "Context and hierarchy in a probabilistic image model," Proceedings of the 2006 IEEE Computer Society Conference on Computer Vision and Pattern Recognition (CVPR'06), Jun. 2006, 2145-2152.
Kamnitsas et al., "Effcient multi-scale 3D Cnn with fully connected CRF for accurate brain lesion segmentation," Med. Image Analysis, Feb. 2017, 36:61-78.
Karasawa e al., "Multi-atlas pancreas segmentation: Atlas selection based on vessel structure," Med. Image Analysis, 2017, 39:18-28.
Kingma et al., "Adam: A method for stochastic optimization," CoRR, submitted on Dec. 22, 2014, arXiv:1412,6980v1, 9 pages.
Kirbas et al., "A review of vessel extraction techniques and algorithms," ACM Computing Surveys, 2004, 36:2:81-121.
Koenig et al., "The Spatial Periodicity of Grid Cells Is Not Sustained During Reduced Theta Oscillations," Science, 2011, 332:592-595.

(56) References Cited

OTHER PUBLICATIONS

Kong et al., "RON: Reverse connection with objectness prior networks for object detection," IEEE Conference on Computer Vision Pattern Recognition, Jul. 2017, 5936-5944.
Kortylewski et al., "Compositional Convolutional Networks for Robust Object Classification under Occlusion," CoRR, submitted on May 29, 2019, arXiv:1905.11826v2, 12 pages.
Kortylewski et al., "Compositional Convolutional Neural Networks: A Deep Architecture with Innate Robustness to Partial Occlusion," arXiv:2003.04490v3, Apr. 2020, 10 pages.
Kortylewski et al., "Greedy structure learning of hierarchical compositional models," CoRR, submitted on Jan. 22, 2017, arXiv:1701.06171v1, 16 pages.
Kortylewski et al., "Probabilistic compositional active basis models for robust pattern recognition," Proceedings of the British Machine Vision Conference (BMVC), Sep. 2016, 12 pages.
Kortylewski, "Model-based image analysis for forensic shoe print recognition," Dissertation for the Degree of Doctor of Philosophy, University of Basel, Jun. 2017, 124 pages.
Krizkevsky et al., "ImageNet Classification with Deep Convolutional Neural Networks", NIPS, 9 pages, 2012.
Kroeger et al., "Learning to Segment Neurons with Non-local Quality Measures," MICCAI., 2013, 16:2:419-27.
Kronman et al., "Image Segmentation Errors Correction by Mesh Segmentation and Deformation," MICCAI., 2013, 206-213.
Kwitt et al., "Studying Cerebral Vasculature Using Structure Proximity and Graph Kernels," MICCAI., 2013, 16:2:534-541.
Lampert et al., "Beyond sliding windows: Object localization by efficient subwindow search," IEEE Conference on Computer Vision and Pattern Recognition (CVPR), Jun. 2008, 8 pages.
Lesage et al., "A review of 3D vessel lumen segmentation techniques: Models, features and extraction schemes," SciDirect., 2009, 13:819-845.
Li et al., "Automatic liver segmentation based shape constraints and deformable graph cut in CT images," IEEE tans. on Image Proc., Dec. 2015, 24(12):5315-5329.
Li et al., "AOGNets: Compositional Grammatical Architectures for Deep Learning," Proceedings of the IEEE/CVF Conference on Computer Vision and Pattern Recognition (CVPR), Jun. 2019, 6220-6230.
Li et al., "SymmNet: A Symmetric Convolutional Neural Network for Occlusion Detection," Proceedings of the British Machine Vision Conference (BMVC), Sep. 2018, 14 pages.
Liao et al., "Learning deep parsimonious representations," Advances in Neural Information Processing Systems, Dec. 2016, 29:5076-5084.
Liao et al., "Representation Learning: A Unified Deep Learning Framework for. Automatic Prostate MR Segmentation," MICCAI., 2013, 16:2:254-61.
Lin et al., "Microsoft COCO: Common Objects in Context," Computer Vision—ECCV 2014 (LNCS), Sep. 2014, 8693:740-755.
Lindner et al., "Accurate Bone Segmentation in 2D Radiographs Using Fully Automatic Shape Model Matching Based on Regression-Voting," MICCAI., 2013, 181-189.
Liu et al., "A Variational Framework for Joint Detection and Segmentation of Ovarian Cancer Metastases," MICCAI., 2013, 8150:83-90.
Liu et al., "Automatic pancreas segmentation via coarse location and ensemble learning," IEEE Access, 2019, 9 pages.
Liu et al., "High-Order Graph Matching Based Feature Selection for Alzheimer's Disease Identification," MICCAI, 2013, 16:2:311-318.
Liu et al., "Joint shape representation and classification for detecting PDAC," MLMI@MICCAI, 2019, 8 pages.
Liu et al., "Longitudinal Modeling of Glaucoma Progression Using 2-Dimensional Continuous-Time Hidden Markov Model," MICCAI., 2013, 16:2:444-451.
Liu et al., "Multifold Bayesian Kernelization in Alzheimer's Diagnosis," MICCAI., 2013, 16:2:303-10.
Liu et al., "Tracking of Carotid Arteries in Ultrasound Images," MICCAI., 2013, 16:2:526-33.
Lombaert et al., "Joint Statistics on Cardiac Shape and Fiber Architecture," MICCAI., 2013, 16:2:492-500.
Long et al., "Fully Convolutional Networks for Semantic Segmentation," CVPR, 2015, 3431-3440.
Lorenzi et al., "Sparse Scale-Space Decomposition of Volume Changes in Deformations Fields," MICCAI., 2013, 16:2:328-35.
Lorza et al., "Carotid Artery Lumen Segmentation in 3D Free-Hand Ultrasound Images Using Surface Graph Cuts," MICCAI., 2013, 16:2: 542-9.
Lugo-Fagundo et al., "Deep learning in radiology: Now the real work begins," J. Am, Coll. Radiol., Feb. 2018, 15:2:364-367.
Lundervold et al., "An overview of deep learning in medical imaging focusing on MRI," Zeitschrift für Medizinische Physik, May 2019, 29:2:102-127.
Lv et al., "Group-Wise FMRI Activation Detection on Corresponding Cortical Landmarks," MICCAI., 2013, 16:2:665-73.
Lv et al., "Modeling Dynamic Functional Information Flows on Large-Scale Brain Networks," MICCAI., 2013, 698-705.
Mahapatra et al., "Semi-Supervised and Active Learning for Automatic Segmentation of Crohn's Disease," MICCAI., 2013, 16:2:214-21.
Mahrooghy et al., "Heterogeneity Wavelet Kinetics from DCE-MRI for Classifying Gene Expression Based Breast Cancer Recurrence Risk," MICCA., 2013, 16:2:295-302.
Maier et al, "A gentle introduction to deep learning in medical imaging processing," J. of Med. Physics, Dec. 2018, 31 pages.
Marreiros et al., "Non-rigid Deformation Pipeline for Compensation of Superficial Brain Shift," MICCAI., 2013, 16:2:141-8.
McLeod et al., "Spatio-temporal Dimension Reduction of Cardiac Motion for Group-Wise Analysis and Statistical Testing," MICCAI., 2013, 16:2:501-8.
Melbourne et al., "Measurement of Myelin in the Preterm Brain: Multi-compartment Diffusion Imaging and Multi-component T2 Relaxometry," MICCAI,, 2013, 16:2:336-44.
Mharib et al., "Survey on liver CT image segmentation methods," Artif Intell Rev., 2012, 37:83-95.
Milletari et al., "V-Net: Fully Convolutional Neural Networks for Volumetric Medical Image Segmentation", 2016 Fourth International Conference on 3D Vision,2016, 565-571.
Mori et al., Medical Image computing and computer-assisted intervention—MICCAI 2013, 16th Int. Conf., Sep. 2013, 36 pages.
Nascimento et al., Multi-atlas segmentation using manifold learning with deep belief neworks, IEE, 2016, 4 pages.
NCBI.gov [online], "Pancreatic cancer treatment (adult) (PDQ)," May 15, 2020, retrieved on Oct. 5, 2020, retrieved from URL<https://www.ncbi.nlm.nih.gov/books/NBK65957/?report-printable. 37 pages.
Nouranian et al., "An Automatic Multi-atlas Segmentation of the Prostate in Transrectal Ultrasound Images Using Pairwise Atlas Shape Similarity," MICCAI, 2013, 16:2:173-80.
Okada et al., "Abdominal multi-organ segmentation from CT images using conditional shape-location and unsupervised intensity priors," Med. Image Anal., Dec. 2015, 26:1:1-18.
Oktay et al., "Biomechanically driven registration of pre- to intra-operative 3D images for laparoscopic surgery," MICCAI., 2013, 16:2:1-9.
Ospina et al., "A Tensor-Based Population Value Decomposition to Explain Rectal Toxicity after Prostate Cancer Radiotherapy," MICCAI., 2013, 16:2:387-94.
Petersen et al., "Quantitative Airway Analysis in Longitudinal Studies Using Groupwise Registration and 4D Optimal Surfaces," MICCAI., 2013, 16:2:287-94.
Piuze et al., "Cardiac Fiber Inpainting Using Cartan Forms," MICCAI, 2013, 16:2:509-17.
Porras et al., "Myocardial Motion Estimation Combining Tissue Doppler and B-mode Echocardiographic Images," MICCAI., 2013, 16:2:484-91.
Prasoon et al., "Deep Feature Learning for Knee Cartilage Segmentation Using a Triplanar Convolutional Neural Network," MICCAI., 2013, 16:2:246-53.
Prevost et al., "Registration of Free-Breathing 3D+t Abdominal Perfusion CT Images via Co-segmentation," MICCAI., 2013, 16:2:99-107.

(56) References Cited

OTHER PUBLICATIONS

Qiu et al., "Fast Globally Optimal Segmentation of 3D Prostate MRI with Axial Symmetry Prior," MICCAI., 2013, 16:2:198-205.
Rafii-Tari et al., "Learning-Based Modeling of Endovascular Navigation for Collaborative Robotic Catheterization," MICCAI., 2013, 16:2:369-77.
Rajchl et al., "Deepcut: Object segmentation from bounding box annotations using convulutional neural networks," IEE Trans. Med. Imaging., 2016, 10 pages.
Reddy et al., "Occlusion-Net: 2D/3D Occluded Keypoint Localization Using Graph Networks," Proceedings of the IEEE/CVF Conference on Computer Vision and Pattern Recognition (CVPR), Jun. 2019, 7326-7335.
Ren et al., "Faster R-CNN: Towards Real-Time Object Detection with Region Proposal Networks," Advances in Neural Information Processing Systems, Dec. 2015, vol. 28, 9 pages.
Roe et al., "Toward a Unified Theory of Visual Area V4," Neuron, Apr. 12, 2012, 74(1):12-29.
Romain et al., "A Multi-task Learning Approach for Compartmental Model Parameter Estimation in DCE-CT Sequences, "MICAA., 2013, 16:2:271-8.
Ronneberger et al., "U-Net: Convolutional Networks for Biomedical Image Segmentation", MICCAR, 234-241, 2015.
Roth et al., "Deep convolutional networks for pancreas segmentation in CT imaging," SPIE Med., Imaging, 2015, 9413-94131G.
Roth et al., "DeepOrgan: Multi-level Deep Convolutional Networks for Automated Pancreas Segmentation", MICCAI, 556-564, 2015.
Roth et al., "Hierarchical 3D fully convolutional networks for multi-organ segmentation," ARXIV., Apr. 2017, arXiv:1704.06382, 11 pages.
Roth et al., Spatial aggregation of holistically-nested convolutional neural networks for automated pancreas localization and segmentation, Medical Image Analysis, Apr. 2018, 45:94-107.
Roth et al., "Spatial Aggregation of Holistically-Nested Networks for Automated Pancreas Segmentation", 2016, MICCAI, 451-459.
Roth et al., "Towards dense volumetric pancreas segmentation in CT using 3D fully conventional networks," Medical Imaging, 2018, 6 pages.
Sabuncu et al., "A generative model for image segmentation based on label fusion," IEE Trans. on Med. Imaging, Oct. 2010, 29:10:1714-1729.
Saito et al., "Joint optimization of segmentation and shape prior from level-set-based statistical shape model, and its application to the automated segmentation of abdominal organs," Med. Image Analysis, 2016, 28:46-65.
Sasikumar et al., "First-pass processing of value cues in the ventral visual pathway," Current Biology, Feb. 8, 2018, 28(4):538-548.
Seito et al., "Pulmonary nodule detection in CT images: False positive reduction using multi-view convolutional networks," IEE Trans. on Med. Imag., May 2016, 35:5:1160-1169.
Shen et al., "A Spatial Mixture Approach to Inferring Sub-ROI Spatio-temporal Patterns from Rapid Event-Related fMRI Data," MICCAI., 2013, 16:2:657-64.
Shen et al., Deep learning in medical image analysis, Annu rev. Biomed. En., 2017, 19:221-248.
Simonyan et al., "Very deep convolutional networks for large-scale image recognition," CoRR, submitted on Dec. 23, 2014, arXiv:1409.1556v5, 13 pages.
Simpson et al., "A bayesian approach for spatially adaptive regularisation in Non-rigid registration," MICCAI., 2013, 10-18.
Song et al., "Discriminative Data Transform for Image Feature Extraction and Classification," MICCAI., 2013, 16:2:452-9.
Stone et al., "Teaching Compositionality to CNNs," Proceedings of the IEEE/CVF Conference on Computer Vision and Pattern Recognition (CVPR), Jul. 2017, 5058-5067.
Suk et al., "Deep Learning-Based Feature Representation for AD/MCI Classification," MICCAI., 2013, 16:2:583-90.
Sun et al., "Symmetric stereo matching for occlusion handling," Proceedings of the IEEE Computer Society Conference on Computer Vision and Pattern Recognition (CVPR), Jun. 2005, 399-406.
Tabernik et al., "Towards deep compositional networks," Proceedings of the 23rd International Conference on Pattern Recognition (ICPR), Dec. 2016, 3470-3475.
Tang et al., "Deeply Learned Compositional Models for Human Pose Estimation," Computer Vision—ECCV 2018 (LNCS), Sep. 2018, 11207:190-206.
Tang et al., "Random Walks with Efficient Search and Contextually Adapted Image Similarity for Deformable Registration," MICCAI, 2013, 43-50.
Tang et al., "Towards a unified compositional model for visual pattern modeling," Proceedings of the IEEE International Conference on Computer Vision (ICCV), Oct. 2017, 2784-2793.
The Handbook of Brain Theory and Neural Networks, 2nd ed., Arbib (ed.), 2003, pp. 244-248.
Tong et al., "Multiple Instance Learning for Classification of Dementia in Brain MRI," Med. Image Anal., Jul. 2014, 18:5:808-18.
Uzunbas et al., "Collaborative Multi Organ Segmentation by Integrating Deformable and Graphical Models," MICCAI, 2013, 157-164.
Vaziri et al., "A channel for 3d environmental shape in anterior inferotemporal cortex," Neuron, Oct. 2014, 84(1):55-62.
Vincent et al., "Bayesian Joint Detection-Estimation of Cerebral Vasoreactivity from ASL fMRI Data," MICCAI, 2013, 616-624.
Wang et al., "Abdominal Multi-organ Segmentation with Organ-Attention Networks and Statistical Fusion," CoRR, submitted on Apr. 23, 2018, arXiv:1804.08414v1, 21 pages.
Wang et al., "Abdominal multi-organ segmentation with organ-attention networks and statistical fusion," Medical Image Analysis, 2019, 55:88-102.
Wang et al., "Automated Embryo Stage Classification in Time-Lapse Microscopy Video of Early Human Embryo Development," MICCAI., 2013, 16:2:460-7.
Wang et al., "Detecting semantic parts on partially occluded objects," Proceedings of the British Machine Vision Conference (BMVC), Sep. 2017, 13 pages.
Wang et al., "Discovering Internal Representations from Object-CNNs Using Population Encoding," CoRR, submitted on Nov. 21, 2015, arXiv:1511.06855v1, 12 pages.
Wang et al., "Image quality assessment: Form error visibility to structural similarity," IEE. Trans. on Image. Proces., Apr. 2004, 13:4:600-612.
Wang et al., "Image Quality Assessment: From Error Visibility to Structural Similarity," IEEE Transactions on Image Processing, Apr. 2004, 13:4:600-612.
Wang et al., "Interactive Retinal Vessel Extraction by Integrating Vessel Tracing and Graph Search," MICCAI., 2013, 16:2:567-74.
Wang et al., "Robust Object Detection under Occlusion with Context-Aware CompositionalNets," 2020 IEEE/CVF Conference on Computer Vision and Pattern Recognition (CVPR), Jun. 2020, pp. 12642-12651.
Wang et al., "Sequential Monte Carlo Tracking for Marginal Artery Segmentation on CT Angiography by Multiple Cue Fusion," MICCAI., 2013, 16:2:518-525.
Wang et al., "Visual concepts and compositional voting," CoRR, submitted on Nov. 13, 2017, arXiv:1711.04451v1, 37 pages.
Wang et al., English translation of CN 109685809 A, published on Apr. 26, 2019, 14 pages.
Warfield et al., "Simultaneous truth and performance level estimation (STAPLE): An algorithm for the validation of image segmentation," IEE Trans. Med. Imaging., Jul. 2004, 23:7:903-921.
Wasza et al., "Real-Time Respiratory Motion Analysis Using Manifold Ray Casting of Volumetrically Fused Multi-view Range Imaging," MICCAI., 2013, 16:2:116-23.
Wee et al., "Identification of MCI Using Optimal Sparse MAR Modeled Effective Connectivity Networks," MICCAI., 2013, 16:2:319-327.
Wolz et al., "Automated abdominal multi-organ segmentation with subject-specific atlas generation," IEE Trans. on Med. Imaging, Sep. 2013, 32:9:1723-1730.
Wu et al., "Unsupervised Deep Feature Learning for Deformable Registration of MR Brain Images," MICCAI., 2013, 16:2:649-56.

(56) References Cited

OTHER PUBLICATIONS

Xia et al., "Bridging the Gap Between 2D and 3D Organ Segmentation with Volumetric Fusion Net", MICCAI, 445-453, 2018.
Xiang et al., "Beyond PASCAL: A benchmark for 3D object detection in the wild," IEEE Winter Conference on Applications of Computer Vision, Mar. 2014, 75-82.
Xiang et al., "Object Detection by 3D Aspectlets and Occlusion Reasoning," IEEE International Conference on Computer Vision Workshops, Dec. 2013, 530-537.
Xiao et al., "Tdapnet: Prototype network with recurrent top-down attention for robust object classification under partial occlusion," CoRR, submitted on Sep. 9, 2019, arXiv:1909.03879v1, 11 pages.
Xie et al., "Holistically-Nested Edge Detection", Proceedings of the IEEE International Conference on Computer Vision, 2015, 1395-1403.
Xu et al., "A Symmetric 4D Registration Algorithm for Respiratory Motion Modeling," MICCAI., 2013, 16:2:149-56.
Xu et al., "Automatic Grading of Nuclear Cataracts from Slit-Lamp Lens Images Using Group Sparsity Regression," MICCAI., 2013, 16:2:468-75.
Xu et al., "Spatially Constrained Random Walk Approach for Accurate Estimation of Airway Wall Surfaces," MICCAI., 2013, 16:2:559-566.
Yamane et al., "A neural code for three-dimensional object shape in macaque inferotemporal cortex," Nature Neuroscience, Oct. 5, 2008, 11(11):1352-1360.
Yan et al., "Inferring occluded features for fast object detection," Signal Processing, May 2015, 110:188-198.
Ye et al., "Pathological Site Retargeting under Tissue Deformation Using Geometrical Association and Tracking," MICCAI., 2013, 16:2:67-74.
Yokota et al., "Automated CT Segmentation of Diseased Hip Using Hierarchical and Conditional Statistical Shape Models," MICCAI, 2013 190-197.
Yoldemir et al., "Overlapping Replicator Dynamics for Functional Subnetwork Identification," MICCAI., 2013, 16:2:682-9.
Yu et al., "Recurrent saliency transformation network: incorporating multi-stage visual cues for small organ segmentation," Arxiv, 2017, 10 pages.
Yuille et al., "Abdominal multi-organ segmentation with organ-attention networks and statistical fusion," Med., Image Anal., Jul. 2019, 55:88-102.
Yun et al., "CutMix: Regularization Strategy to Train Strong Classifiers with Localizable Features," CoRR, submitted on May 13, 2019, arXiv:1905.04899v1, 14 pages.
Zhang et al., "Deepvoting: A robust and explainable deep network for semantic part detection under partial occlusion," Proceedings of the IEEE/CVF Conference on Computer Vision and Pattern Recognition (CVPR), Jun. 2018, 1372-1380.
Zhang et al., "Interpretable convolutional neural networks," Proceedings of the IEEE/CVF Conference on Computer Vision and Pattern Recognition (CVPR), Jun. 2018, 8827-8836.
Zhang et al., "Large Deformation Diffeomorphic Registration of Diffusion-Weighted Images with Explicit Orientation Optimization," MICCAI, 2013, 16(Pt 2):27-34.
Zhang et al., "Occlusion-aware R-CNN: Detecting Pedestrians in a Crowd," CoRR, submitted on Jul. 23, 2018, arXiv:1807.08407v1, 17 pages.
Zhang et al., "Personalized Pancreatic Tumor Growth Prediction via Group Learning", MICCAI, 2017, 424-432.
Zhao et al., "Hierarchical Constrained Local Model Using ICA and Its Application to Down Syndrome Detection," MICCAI., 2013, 16:2:222-9.
Zheng et al., "Optic disc and cup segmentation from color fundus photograph using graph cut with priors," MICCAI., 2013, 16:75-82.
Zhou et al., "A Fixed-Point Model for Pancreas Segmentation in Abdominal CT Scans", MICCAI,2017, 693-701.
Zhou et al., "Deep Supervision for Pancreatic Cyst Segmentation in Abdominal CT Scans", MICCAI, 2017, 222-230.
Zhou et al., "Pancreas Segmentation in Abdominal CT Scan: A Coarse-to-Fine Approach." arXiv:1612.08230v1, Dec. 2016, pp. 1-13.
Zhu et al., "A 3D Coarse-to-Fine Framework for Volumetric Medical Image Segmentation", International Conference on 3D Vision, 682-690, 2018.
Zhu et al., "Deep Learning Representation using Autoencoder for 3D Shape Retrieval", Neurocomputing 204: 41-50, 2016.
Zhu et al., "Multi-scale coarse-to-fine segmentation for screening pancreatic ductal adenocarcinoma," ArXiv, 2019, 9 pages.
Zhu et al., "Random Walks with Adaptive Cylinder Flux Based Connectivity for Vessel Segmentation," MICCAI., 2013, 16:2:550-8.
Zhu et al., "Robustness of Object Recognition under Extreme Occlusion in Humans and Computational Models," Proceedings of the 41st Annual Meeting of the Cognitive Science Society: Creativity + Cognition + Computation, Jul. 2019, 7 pages.
Zhu et al., "Unsupervised Structure Learning: Hierarchical Recursive Composition, Suspicious Coincidence and Competitive Exclusion," Computer Vision—ECCV 2008 (LNCS), Oct. 2008, 5303:759-773.
Zhuang et al., Multi-scale patch and multi-modality atlases for whole heart segmentation of MRI, Med Image Analysis, 2016, 31:77-87.
Zu et al., "Robust multi-atlas propagation by deep sparse representation," Pattern Recognition, 2017, 63:511-517.
Cen et al., "Boosting occluded image classification via subspace decomposition- based estimation of deep features," IEEE Transactions on Cybernetics, Aug. 12, 2019, 50(7):3409-22.
Cen et al., "Deep feature augmentation for occluded image classification," Pattern Recognition, Mar. 1, 2021, 111:107737.
Enzweiler et al., "Multi-cue pedestrian classification with partial occlusion handling," In 2010 IEEE Computer Society Conference on Computer Vision and Pattern Recognition, Jun. 13, 2010, 990-997.
Kortylewski et al., "Combining compositional models and deep networks for robust object classification under occlusion," In Proceedings of the IEEE/CVF Winter Conference on Applications of Computer Vision, 2020, 1333-1341.
Yoo, "Deep convolution neural networks in computer vision: a review," IEIE Transactions on Smart Processing and Computing, Feb. 2015, 4(1):35-43.

* cited by examiner

SYSTEMS, METHODS, AND COMPUTER PROGRAMS FOR USING A NETWORK OF MACHINE LEARNING MODELS TO DETECT AN IMAGE DEPICTING AN OBJECT OF INTEREST WHICH CAN BE PARTIALLY OCCLUDED BY ANOTHER OBJECT

STATEMENT OF GOVERNMENTAL INTEREST

This invention was made with government support under grants N00014-18-1-2119 and N00014-20-1-2206 awarded by the Office of Naval Research. The government has certain rights in the invention.

FIELD

The field of this invention is in object detection in an input image, and specifically to detecting objects that can be occluded or not occluded by other objects in the image using components of context to bound the location of the object in the image.

BACKGROUND

Objects present in an image can be either occluded or non-occluded by other objects within the image. Detecting objects that are at least partially occluded can be difficult. Methods to detect objects present in images that include at least a partial level of occlusion are presented.

SUMMARY OF THE INVENTION

The present disclosure is directed towards systems, methods, and computer programs, for detecting objects in an image. In some implementations, the objects can be objects that are at least partially occluded.

According to one innovative aspect of the present disclosure, a method for detecting an occurrence of an occluded object in an image. In one aspect, the method can include actions of obtaining, by one or more computers, a first feature set that represents a first image that depicts a first type of object, wherein the first feature set preserves the spatial features of the first image, providing, by one or more computers, the obtained first feature set as an input to a first machine learning model that has been trained to process a feature set that preserves spatial features of an image depicting an object of the same object type as the first type of object and generate output data for each class of a plurality of different classes that each correspond to a particular spatial orientation of an object of the same object type as the first type of object, where the first output data for each class represents a likelihood that an image represented by the first feature map depicts an object in a particular spatial orientation that corresponds to the class, providing, by one or more computers, the obtained first feature set as an input to a second machine learning model that has been trained to process a feature map corresponding to an image of any object type and generate output data that includes an occlusion likelihood, wherein the occlusion likelihood indicates a likelihood that an object depicted in an image represented by a feature set processed by the second machine learning model is at least partially occluded, processing, by one or more computers, the obtained first feature set through the first machine learning model to generate first output data, processing, by one or more computers, the obtained first feature set through the second machine learning model to generate second output data, determining, by one or more computers and based on the first output data and the second output data, a score that indicates a likelihood that the first image depicts an object of the first type that is at least partially occluded, and based on a determination that the determined score satisfies a predetermined threshold, generating, by one or more computers, third output data that includes an instruction indicating that an object of the first type that is at least partially occluded has been detected.

Other versions include corresponding systems, apparatus, and computer programs to perform the actions of methods defined by instructions encoded on computer readable storage devices.

These and other versions may optionally include one or more of the following features. For instance, in some implementations, the first machine learning model can include a generative compositional model, and wherein the generative compositional model processes the first feature set to generate a second feature set as an output of the generative model.

In some implementations, the generative compositional model can include a plurality of class models, each class model corresponding to an object that can be represented in an input image from a different viewpoint.

In some implementations, the generative compositional model can include a plurality of class models, each class model corresponding to a different object viewed from the same viewpoint.

In some implementations, the output of the generative compositional model can include the second feature set includes a plurality of feature sets represented as set of scores, each score representing the likelihood that the object corresponding to a particular class model in the plurality of models is represented in the first feature set, wherein the score associated with the first feature set represents the likelihood that the object represented in the first feature set was depicted in the first image at a particular position.

In some implementations the second machine learning model is an object occlusion model and the object occlusion model can process the first feature set to generate a third feature set as an output of the occlusion model.

In some implementations, the object occlusion model can include a model, trained by a plurality of input images with known occlusion, that is configured to generate occlusion output data, the occlusion output data indicating a measure of the likelihood that an object of any type is present, the object of any type being different from the object of the first type.

In some implementations, the occlusion output data can include an occlusion map that represents the likelihood that an object of any type different from an object of the first type is present and occluding the object of the first type.

In some implementations, the occlusion output data can represent a variation of the first input image, the occlusion output data being an occlusion map that displays the likelihood that an object of any type different from an object of the first type is present and occluding the object of the first type.

In some implementations, the displayed likelihood on the occlusion map is represented as a score in a continuous range between '0' and '1', each score corresponding to a color representation on the occlusion map.

In some implementations, the occlusion map can include a heat map.

In some implementations, the first output data can include a likelihood map and the likelihood map can include a score that a feature of an object depicted in the first image is represented in the first feature set and the second output data can include a object occlusion map, the object occlusion map including a score that represents a likelihood that an object of any type is present and occluding the object of the first type depicted in the input image.

In some implementations, the method can further include a step of combining the likelihood map with the object occlusion map to generate output score data for each class represented in the first machine learning model output.

In some implementations, the output score data can include positional output score data on feature occlusion likelihood map, the feature occlusion likelihood map can represent a plurality of positional scores that a feature is present and occluded at a corresponding position in the first image.

In some implementations, the output score data can include a score value corresponding to each of a plurality of classes represented in the generative compositional model. In such implementations, the score value can represent the likelihood that each class represented in the generative compositional model is present depicted in the first feature set of the first input image.

In some implementations, the method can further include upon computing the score value for each class: represented in the generative compositional model, selecting the maximum score value as the class being represented in the first feature set depicted in the first image and converting the object occlusion map associated with the maximum score to a binary occlusion map, the binary occlusion map representing if an object of any type is occluding an object of the first type.

In some implementations, the step of converting the object occlusion map into a binary occlusion map can further include the step of: comparing a positional occlusion likelihood score, representing the likelihood that a particular position is occluded, against a predetermined threshold upon determine that a positional occlusion likelihood score exceeds the predetermined threshold, marking the position in the binary occlusion map as a value that represents the position is occluded, and upon determine that a positional occlusion likelihood score does not exceed the predetermined threshold, marking the position in the binary occlusion map as a value that represents the position is not occluded.

Traditional deep convolutional neural networks include a fully-connected classification layer at the head of the DCNN. One advantage of this work is that the fully connected classification layer is replaced with a compositional layer that is regularized to be fully generative in terms the neural feature activations of the last convolutional layer. The compositional model integrates a plurality of lower level convolutional models that represent classes for different parts of objects. Generative properties of the compositional layer enables the network to localize occluders in an image and subsequently focus on the non-occluded parts of the object in order to classify the image more robustly and accurately than traditional object classifiers.

Traditional neural networks are not robust to classifying occluded objects, including partially occluded objects. An advantage of this work is that the generative compositional model significantly outperforms traditional methods for object detection when occlusion is present.

Traditional neural networks do not localize occluders of objects in the input image. An advantage of this work is that the occlusion model localizes the occluders of objects by providing a likelihood of occlusion in some locations in an input image.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

The present disclosure is directed to systems, methods, and computer programs that use one or more machine learning models for detecting an object in an image even if the object is occluded by another object. In some implementations, the present disclosure can be configured to detect an object using a first machine learning model configured to detect and separate an object present in the image from the context or background surrounding the object. In some implementations, the present disclosure can be trained to be context aware such that it can detect an object against a particular type of background, in a particular environment, or in the presence of occlusion.

In some implementations, the present disclosure can identify the presence of an object even if it is buried under heavy occlusion, then estimate the location using a voting-based mechanism to localize a bounding box surrounding the object. The voting-based mechanism localizes on the object by generating probability maps identifying the most likely position for a bounding box, which includes showing the probable location of two opposite corners of the box and the center of the object.

In some implementations, the present disclosure can be configured to predict a likelihood that an image depicts an occluded object based on an evaluation of an overall classification score that is generated as a function of outputs of a generative compositional model for object detection, identification, localization, and an occlusion detection model. In particular, the output of the generative compositional model provides the likelihood that features are predicted in an image, which can include object-based features and context-based features. The output of the generative compositional model can further provide the bounding box surrounding an object present in the image based on the most likely locations of the center of the object and the edges of the object. The output of the occlusion detection model provides a likelihood that an object detected in the input image is occluded by an object of another type. The output of the occlusion detection model can be combined with the outputs of the generative compositional model to provide a score and an occlusion map that generally determines if an object is detected and the level of occlusion of the object. Using this output, the type of object detected as well as the locations of occlusion, if any, can be determined.

Figure 1:
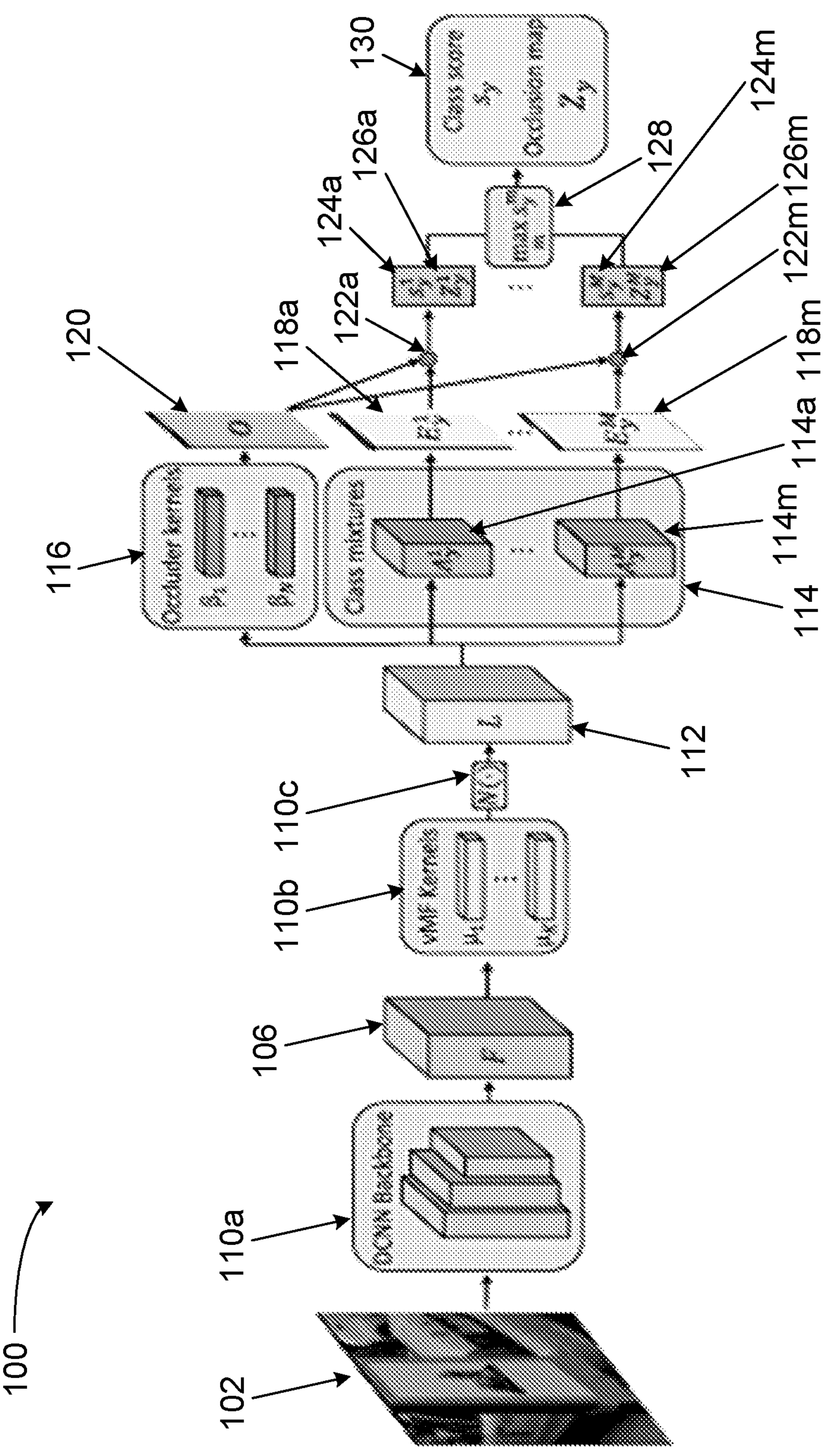
FIG. 1 is a diagram of an example of a system for using a network of machine learning models to detect an image depicting an occluded object of interest.

FIG. 1 is a diagram of an example of an object detection system 100 that includes a generative compositional model to detect objects in an image, and an occlusion detection model that determines a level of occlusion of an object depicted in the input image. The system 100 can include a first machine learning model 110, a second machine learning model 114, an object occlusion model 116, an output adjustment module 124, and an evaluation module 128. Each model or module may be implemented as a software component, hardware component, or combination thereof. A software component may include software instructions whose functionality and/or characteristics can be realized by using one or more processors to execute the software instructions. A hardware component may include hardware logic gates of one or more integrated circuits such as an Field Programmable Gate Array (FPGA) or an Applicant Specific Integrated Circuit (ASIC).

The system 100 can be configured to detect when an input image 102 processed by system 100 includes an object of interest, even if the object is partially occluded by another object. For example, in some implementations the object detection system 100 can include a second machine learning model 114 that is trained to detect a particular object of interest within an image using based on a voting mechanism that identifies the estimated location of the object as well as the corners of a bounding box that identifies the location of the object. In such implementations, the object detection system 100, as a whole, can be configured to detect objects, such as a car, within an images wherein all or a portion of the car is depicted in an image as being occluded, e.g., behind, another object such as a tree, fence, light post, a person, a bicycle, another car, or any other object. The system 100 can be configured to determine the approximate center of the object as well as two opposite corners of a bounding box identifying the location of the object. In some implementations, the system 100 can be configured to detect an object under heavy occlusion or no occlusion.

The system 100 can receive an input image 102. For example, the system 100 can be configured to receive an input image 102 that was captured, or otherwise generated, by any imaging device. An imaging device can include a digital camera, thermal imaging device, radar imaging device, lidar imaging device, or any other type of imaging device. The imaging device can be communicatively coupled to the system 100 in any way. For example, the imaging device can be directly coupled to the system 100 via a USB cable, a USB-C cable, or the like. In other implementations, the imaging device can be coupled to the system 100 via one or more networks. The networks can include one or more wired networks or one or more wireless networks such as a LAN, WAN, wired Ethernet, WiFi network, cellular network, the Internet, or any combination thereof. In some implementations, the input image 102 can be a frame of a video obtained from a video stream. In some implementations, there is no requirement of an imaging device being communicatively coupled to the system 100. For example, in some implementations, the input image 102 can be obtained from a storage device that is accessible by the system 100.

The input image 102 can include image data that represents an object. The object depicted in the input image can be partially occluded or non occluded. However, for purposes of the example described by the present disclosure, it is assumed that the input image 102 of the present disclosure includes a partially occluded object.

In some implementations, the input image 102 can be pre-processed in order to prepare the input image 102 for input to the first machine learning model 110. For example, in some implementations, the input image 102 can be up-sampled or down-sampled to a particular size. Alternatively, or in addition, the input image 102 may be formatted into a particular format expected by the first machine learning model 110. If such pre-processing operations are required, then the pre-processed image can be provided as an input to the first machine learning model 110. Alternatively, if the input image 102 is already in a format that is suitable for input to the first machine learning model 110, then the input image 102 can be provided as input to the first machine learning model 102.

The first machine learning model 110 can obtain the input image 102 as input. In some implementations, the first machine learning model can include a deep convolutional neural network (DCNN). The first machine learning model 110 can process the obtained input image 102 through one or more first layers **110*a* in order to generate a feature set 106 that numerically represents the features of the input image 102. The feature set 106 includes features object based features of the image as well as context-based features of the image, where the object based features are features that depict an object and the context-based features depict the context of the image surrounding the object. In some implementations, for example each feature of the feature set 106 can be, for example, a numerical representation of a pixel or group of pixels in the input image 102. In the example of FIG. 1, the feature set 106 can represent the features of the input image 102** in a manner that maintains the spatial orientation and the spatial resolution of the image.

The one or more first layers **110*a* of the first machine learning model 110 can include a DCNN backbone. The features of the feature set 106 output by the one or more first layers 110*a* can be dependent on how the one or more first layers 110*a*** are trained.

For example, the one or more first layers **110*a* can be trained on labeled training images. The label can describe a set of features that the one or more first layers 110*a* should output for a particular training image. The parameters of the one or more first layers 110*a* can be adjusted such that particular features in the feature set 106 can be detected by the one or more first layers, within a threshold amount of error, corresponding to the label of the training image. By way of example, the one or more first layers 110*a* can be trained to generate a numerical representation of the input image 102 in manner that numerically represents the pixels of the input image 102 so that the spatial relationships of each of the pixels of the input image 102** is maintained.

The first machine learning model 110*a* can also include a feature activation layer. The feature activation layer can include a kernel layer 110*b* and a non-linear activation function 110*c*. The trained feature activation layer can obtain the feature set 106 and then process the feature set 106 to extract a subset of the features 112 in the feature set 106 that aligns with the features of a particular class. This can be achieved by training the kernel layer 110*b* on training images that have been labeled with a vector that have features that have been activated based on the class of the training image.

The kernel layer 110*b* can include a mixture of a plurality of probability distributions. In some implementations, each probability distribution can correspond to a particular kernel that receives, as input, the feature set 106 that was generated by the DCNN 104. Each kernel of the plurality of kernels in the kernel layer 110*b* can be configured to identify a particular object from a plurality of different viewpoints and distances. Additionally, the plurality of kernels in the kernel layer 110*b* can include kernels that are configured to identify a particular context surrounding an object in a particular environment.

By way of an example, each of a plurality of images can include a vehicle. However, one or more images of the plurality of images can depict a different portion of the vehicle. For example, one image may only show the passenger side, one image may show the driver's side, one image may show the hood of the car, another image may show the trunk of the car, one image may only show the driver's side quarter-panel, one image may only show the rear-view mirror on the passenger's side, and the like. Additionally, the car can be surrounded by the background or context, which can include occlusion, or scenes of the environment surrounding the car. For example, the occlusion can include images of objects occluding the car, such as another vehicle, signage, pedestrians in the vicinity, etc. The background can provide context of the environment, such as surrounding structures or buildings, roadway images, or objects along the side of the traffic-way.

To accommodate the varying viewpoint of any particular incoming input image, the kernel layer 110*b* can include a plurality of sets of kernels with each set of kernels capturing a plurality of distributions representing different viewpoints of a particular object. Other kernels in the kernel layer 110*b* represent context-based viewpoints, such as images of the surrounding environment. A kernel of depth N can capture N different viewpoints of a particular object, and therefore, can include robustness to different variations in the viewpoint of each object or a plurality of environmental viewpoints of the context surrounding the image. In some implementations, the kernel layer 110*b* can be configured as a mixture of von-Mises-Fisher (vMF) distributions, defined as:

$$p(F|\Theta_y) = \sum_m v_m p(F|\theta_y^m), \tag{1}$$

$$p(F|\theta_y^m) = \prod_p p(f_p|\mathcal{A}_{p,y}, \Lambda), \tag{2}$$

$$p(f_p|\mathcal{A}_{p,y}, \Lambda) = \sum_k \alpha_{p,k,y} p(f_p|\lambda_k). \tag{3}$$

The kernel layer 110*b* processes the feature set 106 at the input by each of the plurality of kernels and generates as an output a set of features are that represent the convolution of the feature set 106 as specified by each particular kernel that is configured for a particular viewpoint of an object.

The non-linear activation layer 110*c* can obtain the output of the kernel layer 110*b* that includes the convolution of the feature set 106. This output can indicate a measure of alignment between the input features in the features set 106 and the features of each kernel of the kernel layer 110*b* are configured to identify. The measurements generated can represent a measure of similarity between the features of a particular kernel and the features in the input feature set 106. Some of the features that correspond to parts of an object present in the input image 102, while other features correspond to context of the image. In some implementations, the more similar an input feature set 106 is to the feature set of a particular kernel, the more likely it is that the image feature set 106 corresponds to an image of the viewpoint associated with features of a particular kernel of the kernel layer 110*b*. Thus, the system 100 can infer that the image feature set 106 derived from an input image 102 of a particular viewpoint class based on an evaluation of the level of similarity between, the input feature set 106 and the features of each respective kernel of the kernel layer 110*b*.

In some implementations, the non-linear activation layer 110*c* can be configured to select the highest likelihood alignment class as the class the input features belong while suppressing the features that do not align with the kernels of the kernel layer 110*c*. In some implementations, this can include configuring the non-linear activation layer 110*c* as a Rectified Linear Unit Layer (ReLU). In other implementations, the non-linear activation layer 110*c* can be configured as a von-Mises-Fisher (vMF) activation function. The non-linear activation layer 110*c* selects the highest likelihood alignment class by, e.g., evaluating the output of each kernel of the kernel layer 110*b* and selecting the class associated with the particular kernel that the output data indicates the feature set 106 was most similar to. The non-linear activation layer 110*c* passes the features of the feature set 106 that correspond particular features in the input image 102 to an output as a likely feature set 112.

The feature set 112 can include a subset of features that correspond to the features of the kernel to which it most closely aligns and preserves the spatial features and orientation of the input image 102. The feature set 112 includes features that represent an object being present in the image, as well as the context surrounding the object in the image. The selected subset of features of the feature set 112 can represent a depiction of the object in the particular spatial orientation, as it appeared in the image 102. This particular subset of features can correspond to one or more portions of the object or the object itself. Other selected features in the subset correspond to context-based features that are not part of the object, but represent the environment an object is typically found in. By way of example, assuming that a complete image of a vehicle may depict of the entirety of tires, a door, a window, and:

other objects on the vehicle. The feature set 112 may include the features of a selected subset of the portions of the car. However, the feature set 112 can also include context-based features that depict the surrounding scene. By way of example, a car can be found on a highway or in a city with structures in the background. The context-based features are captured by the background in which the car can be found. The output feature set 112 that is generated at the output of the activation layer 110*c* includes a plurality of object based features and context-based features. The features, being object based or context based, can be weighted according the following equation.

$$p(f_p|\mathcal{A}^m_{p,y}, X^m_{p,y}, \Lambda) = \omega\, p(f_p|\chi^m_{p,y}, \Lambda) + (1-\omega)p(f_p|\mathcal{A}^m_{p,y}, \Lambda)$$

According to the equation, the parameter w can be set by the user, and can represent the tradeoff between the object-based features and the context-based features. The output feature set 112 includes a weighted combination of object-based and context-based features that correspond to the features of the kernel class that were selected by the non-linear activation layer 110*c* as being most similar to the feature set 106. Details about the context segmentation that splits the context-based features from the object-based features are discussed with reference to FIG. 4.

The feature set 112 is then provided as an input to the second machine learning model 114 and the object occlusion model 116 for further downstream processing after being processed by the non-linear activation layer 110*c*. The second machine learning model 114 can include a generative compositional model that has been trained to process a feature set that preserves spatial features of the objected depicted by the input image 102 and generate output data 118*a* to 118*m* for each class of a plurality of different classes that each correspond to a particular spatial orientation of an object of the same object type depicted by the input image 102 (where m is any positive integer greater than 0). The object occlusion model 116 can include a machine learning model that has been trained to process a feature set corresponding to an image of any object type and generate output data that indicates an occlusion likelihood. The occlusion likelihood can include a likelihood that an object depicted in an image represented by a feature set 112 processed by the object occlusion model is at least partially occluded. The feature set 112 can be input to the second machine learning model 114 and the object occlusion model 116 in any order, simultaneously, or substantially simultaneously.

The second machine learning model 114 can be trained using a plurality of feature sets that each correspond to a training image that depicts an object of interest or a context based feature at different respective viewpoints. During such training, the training images can be labeled with a particular orientation and the second machine learning model can be trained to infer the orientation of the processed feature set. In some implementations, for example, the second machine learning model 114 can be trained by processing a training feature set through the second machine learning model, comparing the output generated by the second machine learning model based on processing the training feature set to the label of the training feature set, and then adjusting the parameters of the second machine learning model based 114 based on the differences between the label and the output of the second machine learning model 114. This training process can iteratively continue until the output generated by the second machine learning model 114 match (or substantially match) the label associated with the training feature set processed by the second machine learning model, at which point the second machine learning model 114 will be determined to be fully trained.

In general, the second machine learning model 114 can include a plurality of compositional models 114*a*, 114*m*, up to m potential models in the plurality of compositional models, with each model corresponding to a particular orientation of an object or orientation of a partial view of the object. The feature set 112 that is provided as input to the generative compositional model 114 can be received by each of the plurality of compositional models 114*a*, 114*m*. Each model processes each feature in the feature set 112 to generate as output data a likelihood map 118*a*, 118*m*. The likelihood map 118*a*, 118*m*, which includes the measure of likelihood that each feature in the first feature set belongs to each compositional model 114*a* to 114*m* in the plurality of compositional models 114, provides a set of likelihoods that the corresponding features of the models were depicted in the input image 102. By way of example, the likelihood map 118*a*, 118*m* can represent a measure that the input image 102 includes an object in a particular orientation that is associated with each of the models 114*a* to 114*m*. In some implementations, the measure of likelihood can be determined by the joint probability given by:

$$p(F|\Theta_y) = \sum_m v^m p(F|\theta^m_y).$$

Here, m is the number of mixtures of compositional models and $v_m$ is a binary representation that the mixture component is present in the input image. Intuitively, each mixture component m can represent a different viewpoint of an object. The parameters of the mixture model are trained into the model parameters, respectively. The second machine learning model 114 is trained with a localization capability that is configured to detect an object present in the input image 102 and identify the object by a bounding box, even if the object is heavily occluded. The localization capability includes a detection layer and a robust bounding box voting capability.

The detection layer of the second machine learning model 114 is configured to determine the center of an object in an input image 102. A corresponding object model 114 is decomposed and trained into the mixture of compositional models, where each mixture component represents the object class from a different pose. The training images are cropped based on a bounding box of a top-level object model. The second machine learning model 114 acts collectively, with the mixture of composition models to accumulate votes from the plurality of part models across different spatial positions p of the feature set 112. By making the object centered in the image, each mixture component can be thought of as accumulating votes from the part models for the object being in the center of the feature map. The detection layer generates as an output a feature map that includes the accumulated votes over the object center over all of the positions p in the feature map. This is computing the most likely center of the object by scanning the all points in the image against the object model for determining the position p that is the most likely center of the object. The output is a spatial likelihood map 118*a*, 118*m* across all positions of the image with the greatest maxima representing the most likely position of the center of the object.

The robust bounding box capability of the generative compositional model 114 determines the locations of two opposite corners of the bounding box using a part-based voting mechanism. The voting mechanism for the corners of the bounding box is similar to the voting mechanism used for determining the center of the object. The generative compositional model 114 is trained using the plurality of individual compositional models 114*a*, $\mathbf{114}_m$. With each compositional model 114*a*, 114*m* representing a part of the object, the generative compositional model can be trained to determine which features are expected to be activated at the approximate corner locations. The expected feature activations at the approximate locations of the corners can include object-based compositional models for edges of the object. In some implementations, the spatial orientation and features are trained into the generative compositional model, such that the approximate location of the corners of the bounding box can be correctly determined. The locations of two opposite corners of the bounding boxes can be determined based on the two points that have the maximum likelihood of the vehicles. Using this method, the corners of the bounding boxes can be determined for objects that nave no occlusion or at least partial occlusion. Additional details about the localization capability are discussed with reference to FIG. 5.

The object occlusion model 116 can obtain as an input the feature set 112 that is output from the non-linear activation layer 110*c*. By way of example, the object occlusion model 116 can be trained using a set of input images with identified first objects and identified second objects. The first objects are objects of the first type, and the second objects are the objects of any type that are occluding the first objects. During training, the model can be configured to identify the objects of a first type in the feature set 112, and determine if a second object is occluding the first object, at least partially, in the input image 102. The object occlusion model 116 processes the feature set 112, and determines, at each position in the feature set 112, if one or more second objects is/are occluding the first object. In some implementations, the object occlusion model 116 can generate output data that is indicative of a binary determination by the object occlusion model 116 as to whether the first object is partially occluded. In some implementations, the object occlusion model 114 can operate to make an occlusion determination using the equations:

$$p(F|\theta_y^m, \beta) = \prod_p p(f_p, z_p^m = 0)^{1-z_p^m} p(f_p, z_p^m = 1)^{z_p^m}, \tag{5}$$

$$p(f_p, z_p^m = 1) = p(f_p|\beta, \Lambda)p(z_p^m = 1), \tag{6}$$

$$p(f_p, z_p^m = 0) = p(f_p|\mathcal{A}_{p,y}^m, \Lambda)(1 - p(z_p^m = 1)), \tag{7}$$

As given by equations (5)-(7) the object occlusion model 116 can determine for each position p in the feature set 112 if the object of the first type is partially occluded or entirely occluded using the information in the feature vector f. Equation (5) computes a product of the joint probability that based on two items, calculated in Equation (6) and in Equation (7) based on the information in an input feature vector, f. Equation (6) calculates the probability that the object of a first type is occluded by an occluding object of any type. Equation (6) can receive the feature vector f as an input and use the information in the vector to determine if an occluding object is present. Opposite to Equation (6), Equation (7) can receive the feature vector f as an input and use the information in the vector to: determine an occluding object is not present. The output of Equation (5) is a joint probability based on the results of Equation (6) and Equation (7) that object of a first type depicted at the position p is occluded by a second object of any type.

In some implementations, the object occlusion model 116 can be trained as a single occlusion model using input images with known occlusions trained in an unsupervised manner. In other implementations, the occlusion model can be a mixture of several models trained in an unsupervised manner. In either case, the object occlusion model 116 computes the occlusion likelihoods at each position p in the occlusion map.

The object occlusion model 116 can generate output data such as an occlusion map 120. The occlusion map 120 can include an occlusion likelihood, at each position p, that indicates the likelihood that an occluding object is present in the input image 102, where p corresponds to a particular pixel in the input image. The occlusion map 120 can have the same dimensions as the likelihood map 120 and represents the map of occlusion likelihoods in the input image 102 at each position that the object depicted in the input image 102 is blocked by an occluding object. Based on the joint likelihood, as computed by Equation (5) above, that an occluding object is represented in the occluding map 120, a binary decision can be provided as second output data from the occlusion model 116 that indicates a decision on the presence of an occluding object. Additionally, a binary occlusion map can be generated for the input image at each position p that indicates a hard determination per position in the image if the object is occluded. In some implementations, the hard determination on occlusion that can be made based on if the occlusion likelihood exceeds a threshold such as 50%. However, the present disclosure is not limited to a threshold of 50%. In implementations, the occlusion threshold can be set by a user.

The system 100 can further include a plurality of output adjustment modules. Each output adjustment modules 122*a* to 122*m* can be configured to receive, as an input, data indicating that spatial likelihood maps 118*a*, 118*m* from the second machine learning model 116 and the occlusion maps 120 from the occlusion model 116. The output adjustment modules 122*a* to 122*m* can combine the spatial likelihood maps 118*a* to 118*m* and the occlusion map 120 to generate a plurality of modified likelihood maps. The modified likelihood map can have at least two components. The two components of the modified likelihood map can include, for example, score data 124*a*, 124*m*, given by $s_y$, and binary map occlusion data 126*a*, 126*m*, given by $$Z_y^m.$$

The score data 124*a*, 124*m* is computed from the spatial likelihood maps 118*a* to 118*m* generated in the generative compositional models 114. The output adjustment module 122*a*, 122*m* can use the individual values corresponding to position p in the spatial likelihood maps 118*a* to 118*m* to calculate a score for each compositional model 114*a*, 114*m*. The score can be a normalized average likelihood across the map for each class and can indicate the likelihood that objects in the output feature map from each of the compositional models are represented in the input image 102. The score data 124*a*, 124*m* represents the likelihood that an object of the first type is, at least partially occluded by an object of any type in the feature set 114. The score data 124*a*, 124*m* is provided as input to an evaluation module 128.

The binary data occlusion map 126*a*, 126*m* is computed based on the likelihood values for the presence of an occluding object in the object occlusion map 120. The map of likelihoods in the occlusion map 120 are based on a decimal value between '0' and '1'. An instruction, representing a hard determination as to whether the decimal value indicates an occluding object is present can be made based on a predetermined threshold that is set by the user. The binary data occlusion map 126*a*, 126*m* is provided as an output of the object adjustment module 122*a*, 122*m* and as an input to the evaluation module 128.

An evaluation module 128 can obtain the score data 124*a*, 124*m* that is computed for the presence of each class represented in the second machine learning model 114. The evaluation module 128 can analyze each score in the score data 124*a*, 124*m* and make a determination as to whether an object is depicted as being present in the input image 102. In some implementations, if the score data 124*a*, 124*m* exceeds a predetermined threshold, then the occlusion map 120 corresponding to the same position p as the score data is flagged as being occluded. In the same implementation, score data 124*a*, 124*m* that does not exceed a predetermined threshold is flagged as not being occluded. The predetermined threshold can be set by a user. In some implementations, more than one score of the score data 124*a*, 124*m* can exceed the predetermined threshold, thus indicating that more than one portion of an object is depicted in the feature data 114. In other implementations, the evaluation module 128 can select the maximum score of the score data 124*a*, 124*m* as the output score 130. The binary data occlusion map 126*a*, 126*m* that corresponds to the output score 130 is passed through the evaluation module 128 as the selected occlusion map. The evaluation module 128 can make a final determination if an object is occluded based on the output score 130 if the output score exceeds a predetermined threshold.

Figure 2:
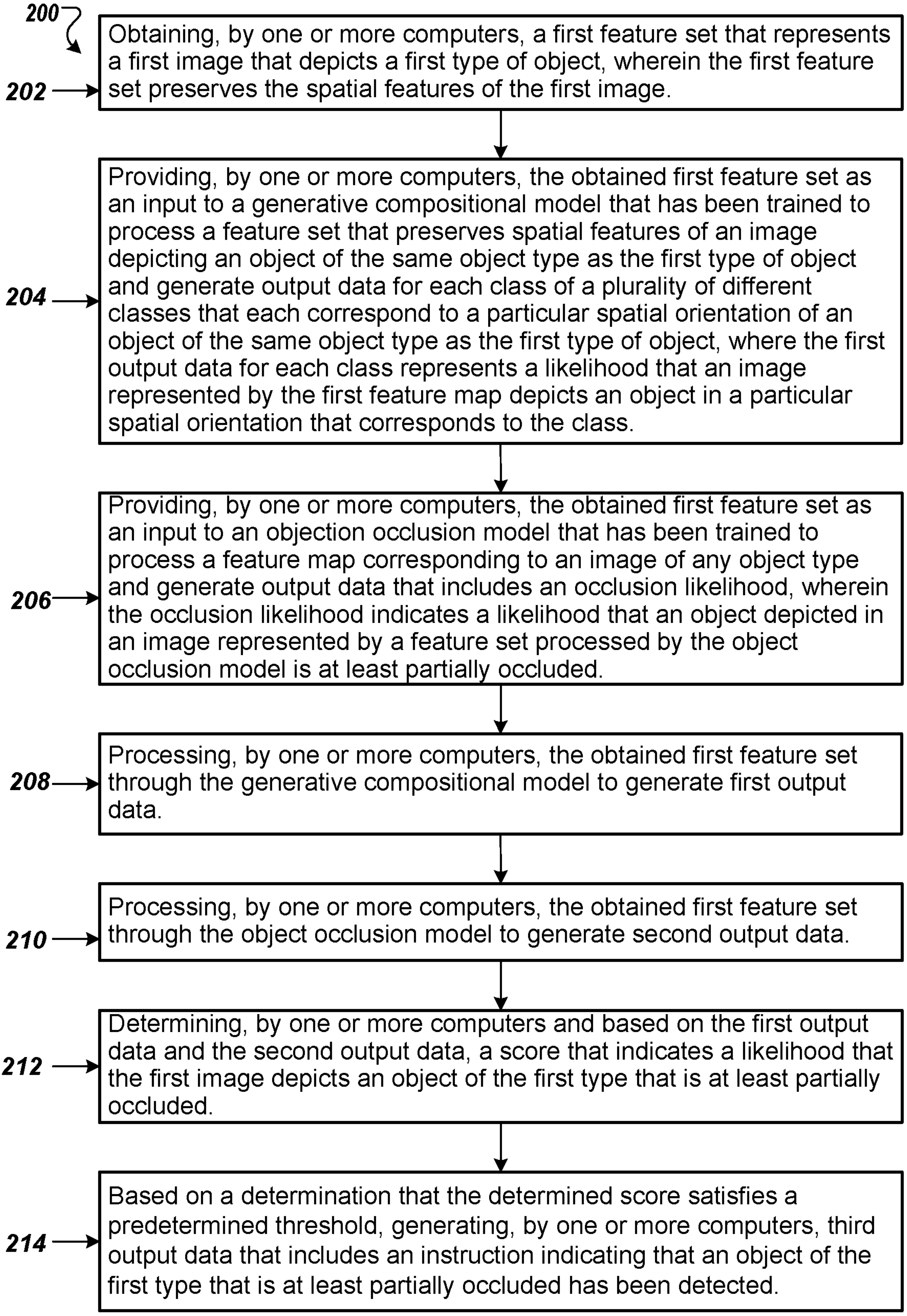
FIG. 2 is a flowchart of an example of a method using a network of machine learning models to detect an image depicting an occluded object of interest.

FIG. 2 displays a process flow chart 200 that the occlusion detection model follows to detect and identify occluded objects that are present in input image data. The process outlined can be executed by a computer system, on a laptop, or any type of computing device that includes a high performance computing capability, which can include a GPU with image processing capabilities.

The process 200 executes by first obtaining an input image form an input image source, such as a camera. The image is ingested into the model where it is processed by a DCNN and a feature activation layer to obtain a first feature set. The first feature set represents a set of features obtained from at least one object of a first type in the input image. The features obtained by processing the image can depict the object of the first type. The DCNN preserves the spatial features and spatial orientation of the image, including the first type of object present in the image (Step 202).

Once the first feature set is obtained, with any objects of a first type depicted by the first feature set, the first feature set is provided as an input to a generative compositional model (Step 204). The model has been trained to ingest the feature set, process it, and output a feature likelihood map. As the model processes the feature set, it maintains or preserves the spatial features and the spatial orientation of the image, which includes any objects of the first type being depicted in the image. The output data generated by the generative compositional model includes a plurality of likelihood maps, each map generated by a model of a particular class (Step 208). Each model within the generative compositional model is trained to detect and identify features from a plurality of objects at a plurality of viewpoints. Alternatively, each model can correspond to a particular spatial orientation of an object depicted in the input image. The likelihood maps represent the likelihood that an object depicted in the image is also represented in the feature maps at the particular spatial orientations of each class (Step 204). Alternatively, the generative compositional model includes a plurality of subordinate models that are trained on images of an object and a plurality of viewpoints. The likelihood map represents the likelihood that an object captured in the input image is associated with the subordinate models in the generative compositional model.

In addition to providing the first feature set as an input to a generative compositional model, the first feature set is provided as input into an object occlusion model. The object occlusion model has been trained by a set of input feature sets with known objects of a second type occluding the objects of a first type depicted in the input images. The images with known occlusion objects of a second type are used to train the occlusion models so that occluding objects can be detected and corresponding occlusion likelihood maps can be generated (Step 206). The output data, including the occlusion likelihood maps indicate the likelihood that an object depicted in the image represented by the feature set and processed by the object occlusion model is at least partially occluded by an object of a second type (Step 210).

The likelihood data map that is generated as an output of the generative compositional model (Step 208) is combined with the occlusion map data that is generated as an output of the occlusion model (Step 210). The combined data includes an assessment of the likelihood data and the occlusion map data and provides a measure, or a score for the combined map data. The score provides an indication, or a likelihood measure that the first image depicts an object of a first type that is at least partially occluded by an object of any type (Step 212).

The score data is provided as input to an instruction block. The instruction block performs a comparison of the score data against a threshold. The threshold can be set by a user prior to operating the occlusion detection system. Score data that is greater than the predetermined threshold is flagged as an indication that an object of a first type is detected and at least partially occluded by an object of any type. The score data that exceeds the threshold also triggers the instruction block to assess the occlusion map data. Any likelihood data in the occlusion map that exceeds a predetermined threshold is rounded to a binary value of either '0' or '1'. Positions that are marked with a '0' indicate that the object of the first type is not occluded by another object of any type, while positions that are marked with a '1' indicate that the object of the first type is occluded by another object of any type. The final score data and the binary occlusion map is provided as an output of the system (Step 214).

Figure 3A:
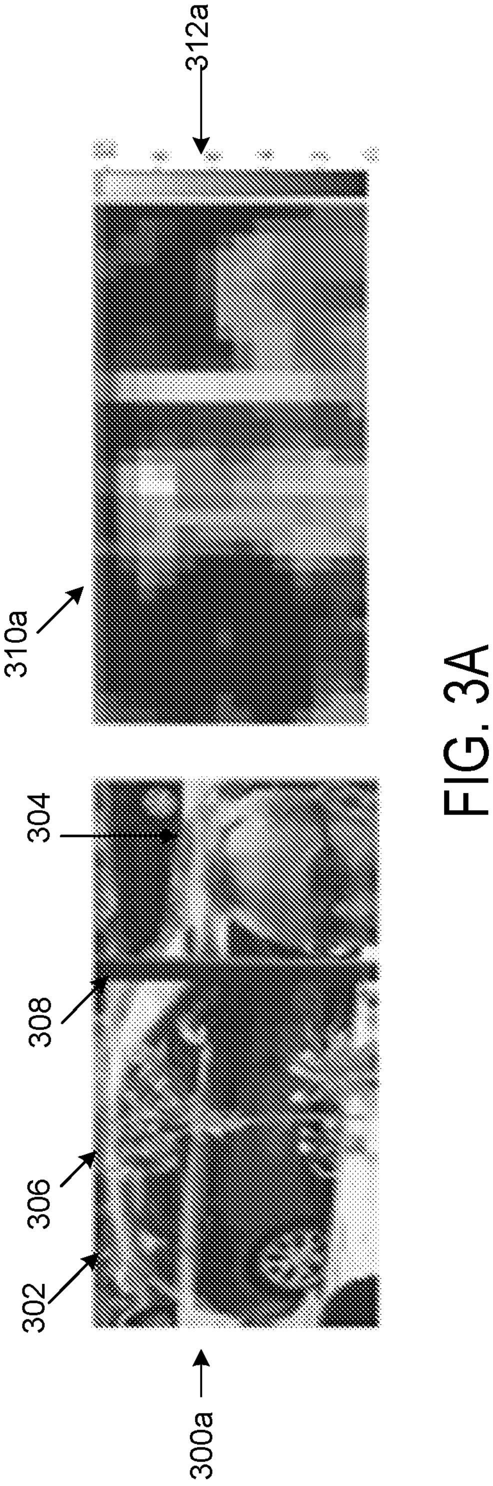
FIG. 3A is an example of an input image that can be input to the system and an output image that can be generated by the object detection model based on processing a feature set representing the first input image.
Figure 3B:
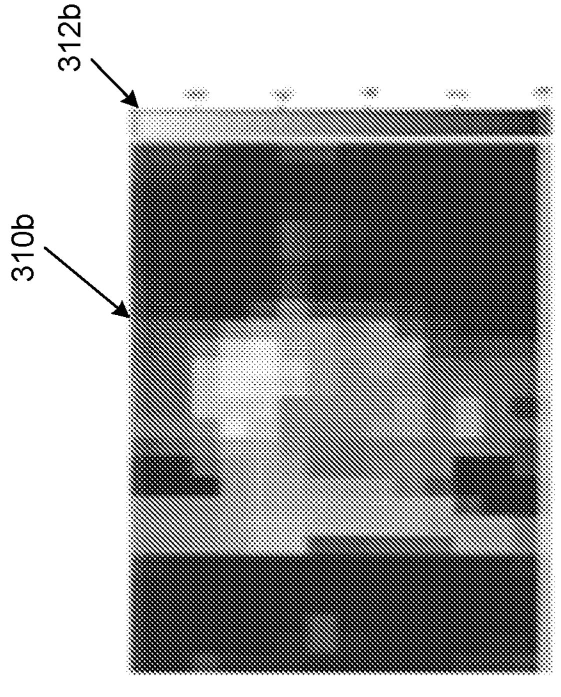
FIG. 3B is another example of an input image that can be input to the system and an output image that can be generated by the object detection model based on processing a feature set representing the input image.
Figure 3B:
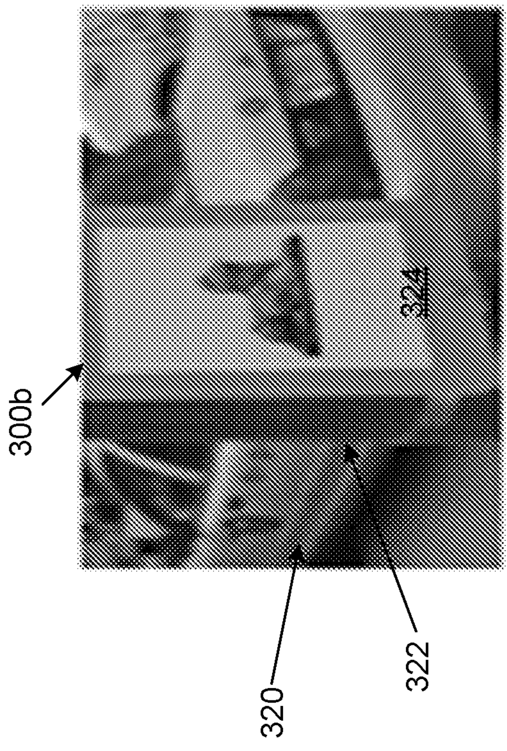
Figure 3C:
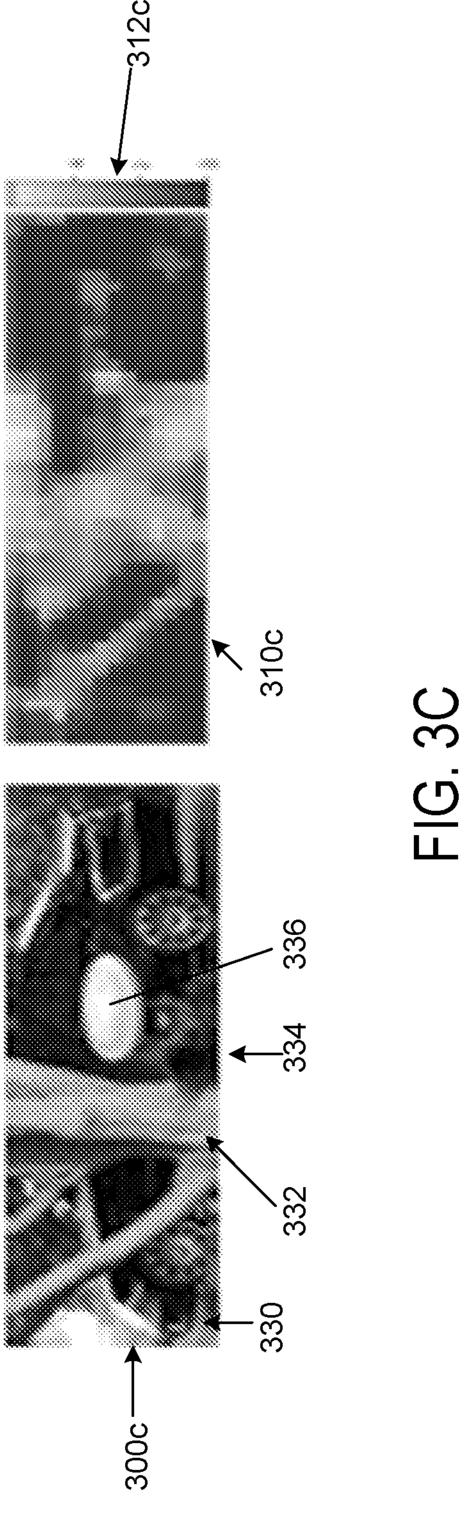
FIG. 3C is another example of an input image that can be input to the system and an output image that can be generated by the object detection model based on processing a feature set representing the input image.

FIGS. 3A, 3B, and 3C display side-by-side comparisons of three original input images 300*a*, 300*b*, 300*c* against example occlusion maps 310*a*, 310*b*, 310*c* that are generated as an output of the object occlusion model 116.

In the first example shown in FIG. 3, the input image 300*a* depicts an image of an object of a first type, the object of a first type being a vehicle 302. The vehicle 302 is occluded by at least three objects of any type. The first object of any type is depicted by a person 304. The second object of any type is depicted by a tree 306. The third object of any type is depicted by a utility pole 308. The vehicle 302 appears to be parked on a roadway positioned behind the plurality of other objects.

As can be seen in the input image 300*a*, the three occluding objects, including the person 304, the tree 306, and the utility pole 308 partially occlude the vehicle 302. The occlusion map 310*a* appearing to the right of the original input image 300*a* is displayed as a heat map with a heat map scale 312. The heat map that represents the occlusion map 310*a* generally resembles the input image 300*a*, with the difference being that the heat map appears in colors that align with the heat map scale 312*a*. Referring to the heat map scale 312*a*, a low level of occlusion corresponds to a darker bluish color, while a high level of occlusion corresponds to a yellowish color. As shown, the locations in the original input image 300*a* corresponding to the person 304 present a greenish color, the greenish color representing a moderate level of occlusion. The tree 306 is shown in a generally brighter hue of green, with at least one patch of bright yellow, in the appropriate location. This indicates a higher level of occlusion than the person 304 does. The utility pole 308 is shown in the appropriate location exhibiting a bright shade of yellow along the height of the vehicle 302. This indicates a high level of occlusion.

With reference to the second example shown in FIG. 3B, the input image 300*b* displays an object of a first type is shown as a yellow taxi 320. The first occluding object is shown as a sign 322. The second occluding object is shown as a utility pole 324 on which the sign is attached. As shown in the occlusion map 310*b*, the occluding objects, including the sign 322 and the utility pole 324 are shown exhibiting a brighter color on the heat map scale 312*b*, thus indicating that object occlusion is occurring.

Figure 4A:
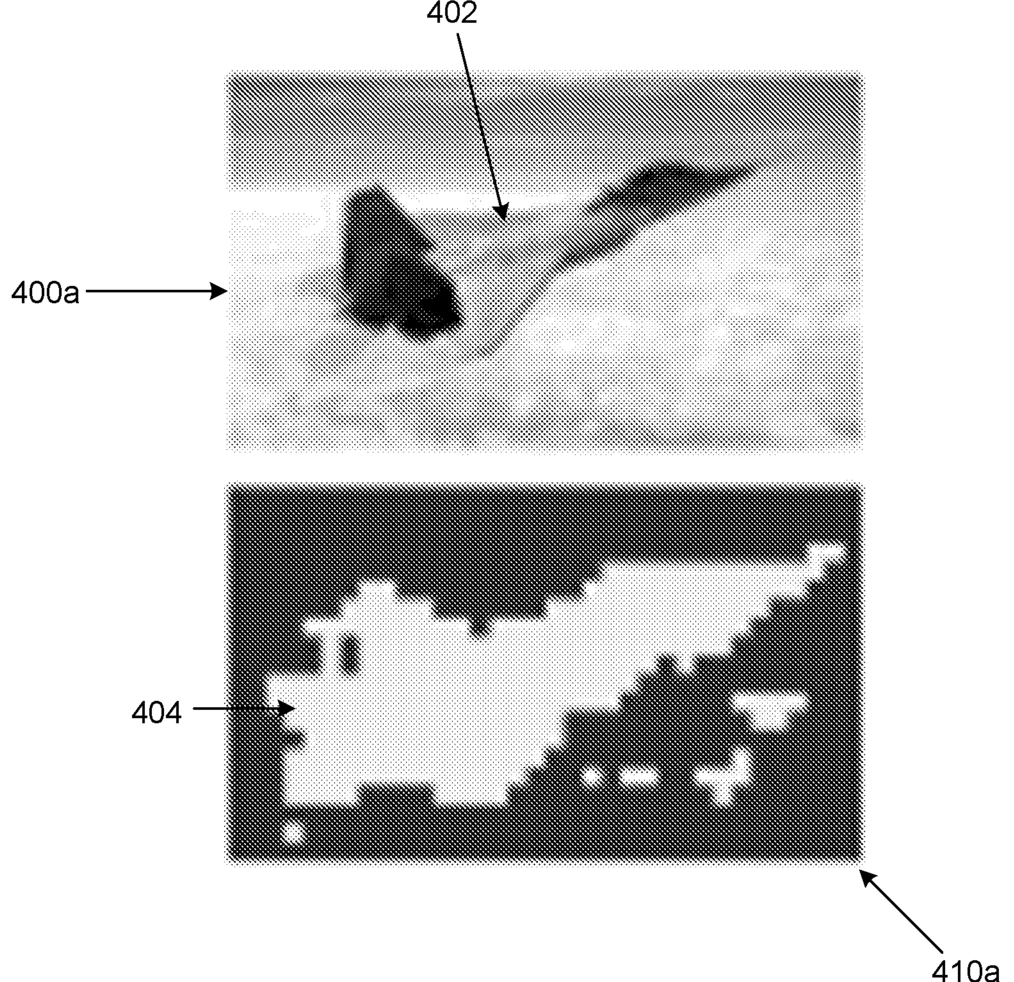
FIG. 4A is an example of an input image that can be input to the system and an output image that can be generated as output of a DCNN depicting the context-aware feature sets based on the system's processing of the input image.
Figure 4B:
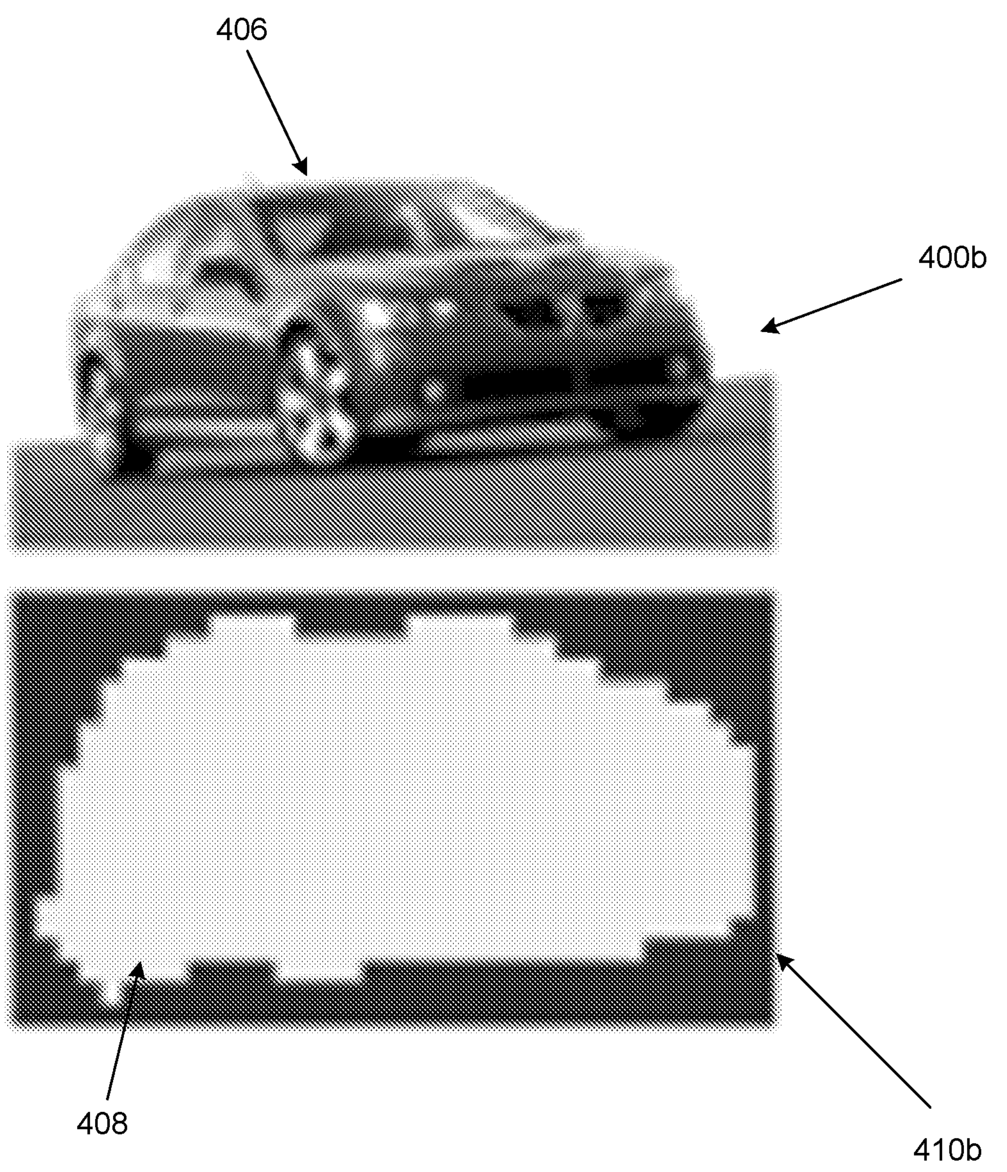
FIG. 4B is another example of an input image that can be input to the system and an output image that can be generated as output of a DCNN depicting the context-aware feature sets based on the system's processing of the input image.
Figure 4C:
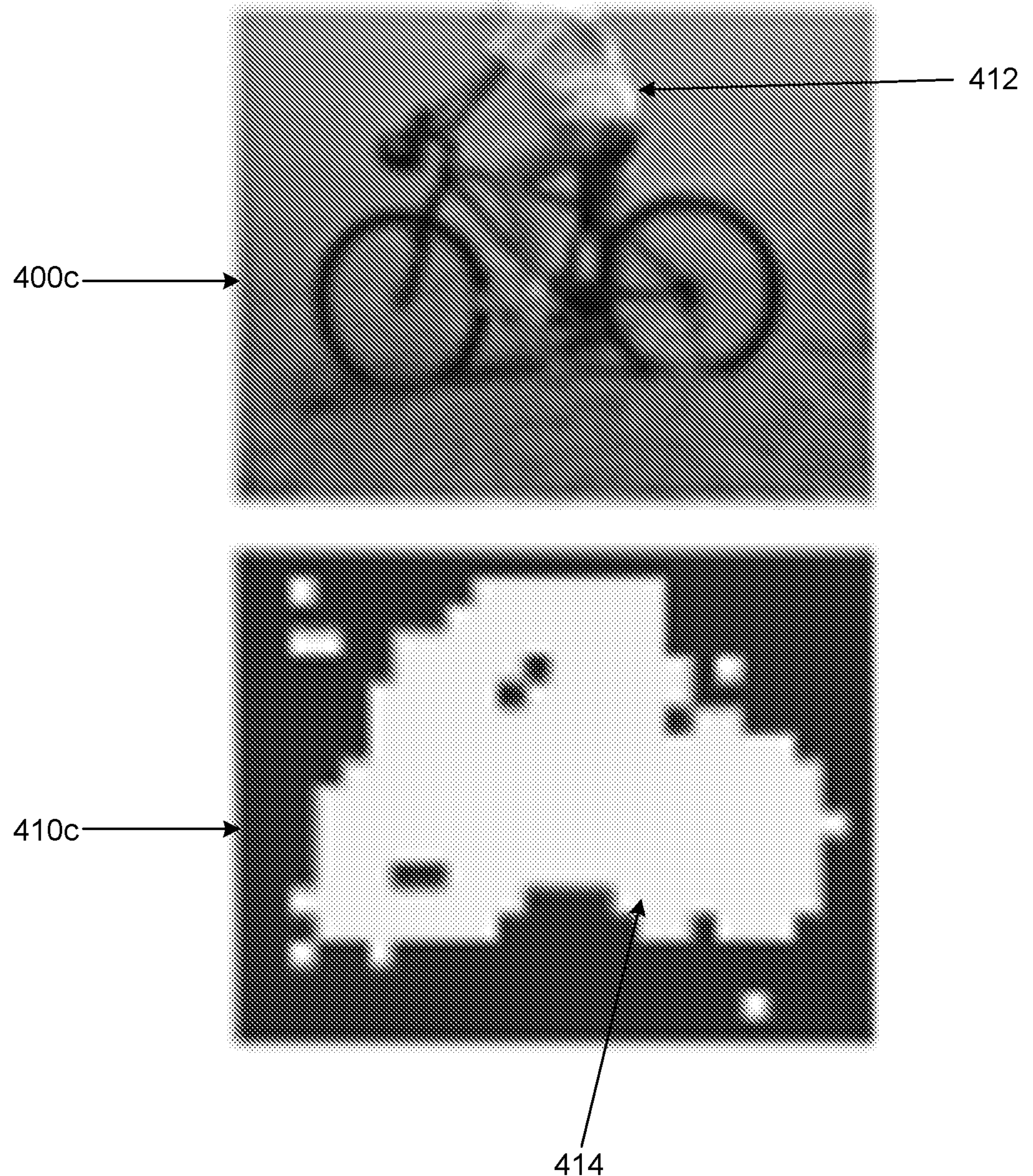
FIG. 4C is another example of an input image that can be input to the system and an output image that can be generated as output of a DCNN depicting the context-aware feature sets based on the system's processing of the input image.

With reference to the third example shown in FIG. 3C, the input image 300*c* displays an object of a first type is shown as a black sedan 330. The first occluding object is shown as a tree 332. The second occluding object is shown as a dog 334. The third occluding object is shown as a Frisbee 336. As shown, the occluding objects, including the tree 332, the dog 334, and the Frisbee 336 are shown in the occlusion map 310*c* exhibiting a brighter color on the heat map scale 312*c*, thus indicating that object occlusion is occurring:

FIGS. 4A, 4B, and 4C display top-bottom comparisons of three original input images 400*a*, 400*b*, 400*c* against example of the output of the context segmentation mechanism that distinguishes between object-based features and context-based features, generated as an output of the activation layer 110*c*.

In the first example shown in FIG. 4A, the top input image 400*a* depicts an image of an object of a first type, the object of a first type being an aircraft 402. The aircraft 402 is displayed in the context of a blue and white background represented by the sky and clouds. The output of the context-aware activation layer appropriately distinguishes between the object-based features and the context-based features. The feature set 112 that is generated at the output of the activation layer 110*c*, as illustrated in example feature map 410*a*, depicts the aircraft phantom 404 as a bright yellowish color, while the background is illustrated as a dark purplish color. As shown, the shape of the aircraft 402, illustrated by the aircraft phantom 404 is generally represented in the image as object-based features while the dark background is represented in the image as context-based features.

In the second example shown in FIG. 4B, the top input image 400*b* depicts an image of an object of a first type, the object of a first type being a car 406. As with the aircraft, the car 406 is displayed in the context of a blue and white background represented by the sky and clouds. The output of the context-aware activation layer appropriately distinguishes between the object-based features and the context-based features. The feature set #12 that is generated at the output of the activation layer 110*c*, as illustrated in the example feature map 410*b*, depicts the car phantom 408 as a bright yellowish color, while the background is illustrated as a dark purplish color. Again, the car phantom 408 is generally represented in the image as object-based features while the dark background is represented in the image as context-based features.

In the third example shown in FIG. 4C, the top input image 400*c* again depicts an image of an object of a first type, the object of a first type being a cyclist 412. Again, the cyclist 412 is displayed in the context of a blue and white background represented by the sky and clouds. The output of the context-aware activation layer appropriately distinguishes between the object-based features and the context-based features. The feature set 112 that is generated at the output of the activation layer 110*c*, as illustrated in the example feature map 410*c*, depicts the cyclist phantom 414 as a bright yellowish color, while the background is illustrated as a dark purplish color. Again, the cyclist phantom 414 is generally represented in the image as object-based features while the dark background is represented in the image as context-based features.

Figure 5:
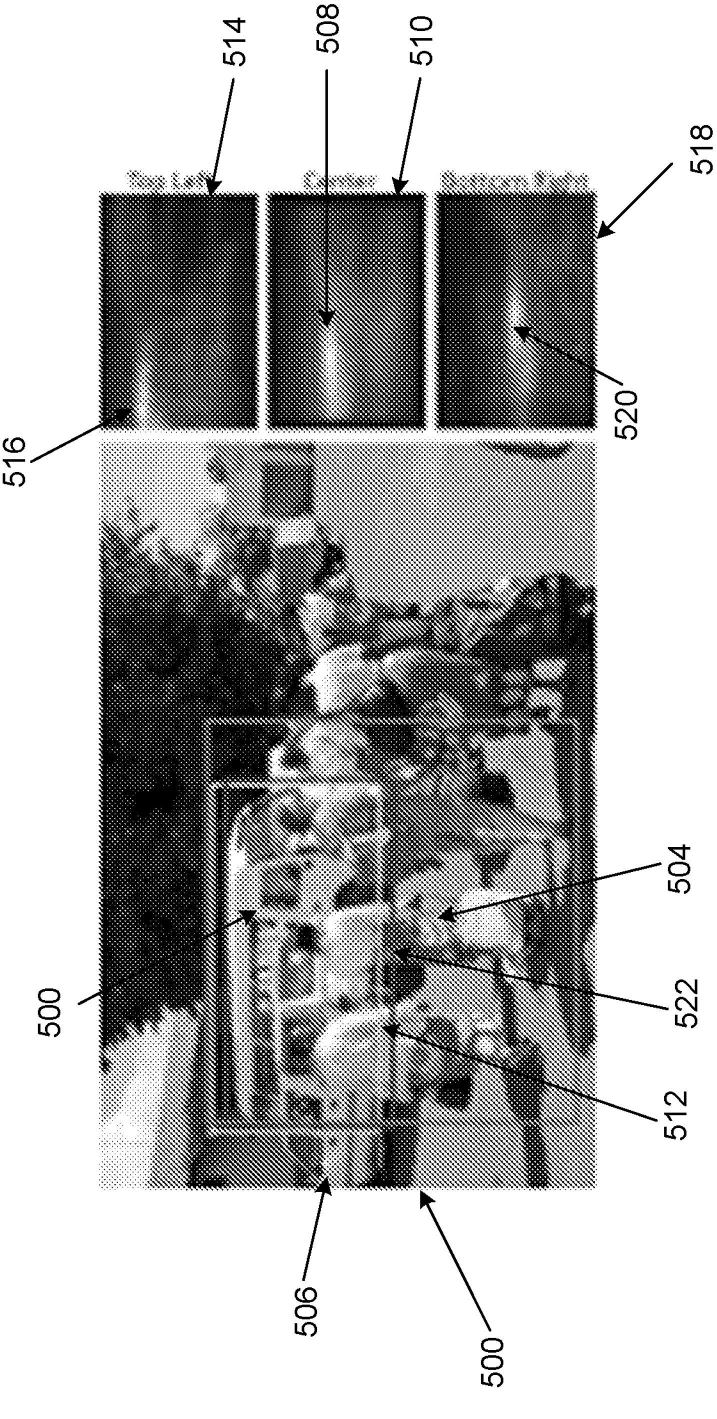
FIG. 5 is a diagram of the bounding box generated by the localization capability of the robust voting mechanism.

FIG. 5 is a display an example of the output of the voting mechanism used for determining an object center as well as the locations of two opposite corners of a bounding box.

An example input image 500 is shown on the left. The image 500 depicts a plurality of vehicles in the background that are at least partially occluded by pedestrians 504 and other vehicles. In the example, a white van 502 is the object of interest. As shown, the van is occluded such that portions of the object are not observable in the image. By way of example, some portions of the van 502 would not be available in the feature set 112 generated at the output of the activation layer 110*c* due to the occlusion by the pedestrians 504 and the other vehicle 506.

The voting mechanism that is performed by the second machine learning model 114 accumulates votes based on part models corresponding to the object of interest. By way of example, the van, being the object of interest, is represented by a plurality of compositional models 114*a*, 114*m* corresponding to the parts of the van are used in the second machine learning model 114. Based on the features of the van that are visible, in this case, a door, windows, windshield, the second machine learning model 114 expects the other features of a van to be present. Additionally, the expected features can be predicted by the second machine learning model 114 to be depicted in specific spatial locations relative to the features that are visible. The compositional models 114*a*, 114*m* that represent the van, as taken from a particular viewpoint, can be spatially connected by the model 114.

The approximate center 508 of the van can be determined based on the voting mechanism as previously described. As depicted in the center probability map 510 to the right of the image 500, the most likely location for the center 508 of the van depicted in image 500 is highlighted by a bright spot in the probability map 510.

The next step to detecting the object of interest is to determine the locations of the opposite corners of a bounding box 512 that is drawn encompassing the object of interest. The bounding box 512, shown in green as generated by voting mechanism, is generally shown to encompass the van. Using the same voting previously described, the compositional model 114 compares the image 102 against the trained parts models for the van at the same spatial resolution and orientation to determine the most likely positional location of the corners of the bounding box 512. As shown, the top right probability map 514 shows the most likely location 516 for the top left corner of the bounding box 512, while the bottom right probability map 518 shows the most likely location 520 for the bottom right corner of the bounding box 512. The bounding box 512, as depicted by the most likely locations 516, 520 for the top left and bottom right corners, is shown accurately identifying the location of the van compared to the ground truth bounding box 522 depicted in blue.

Figure 6:
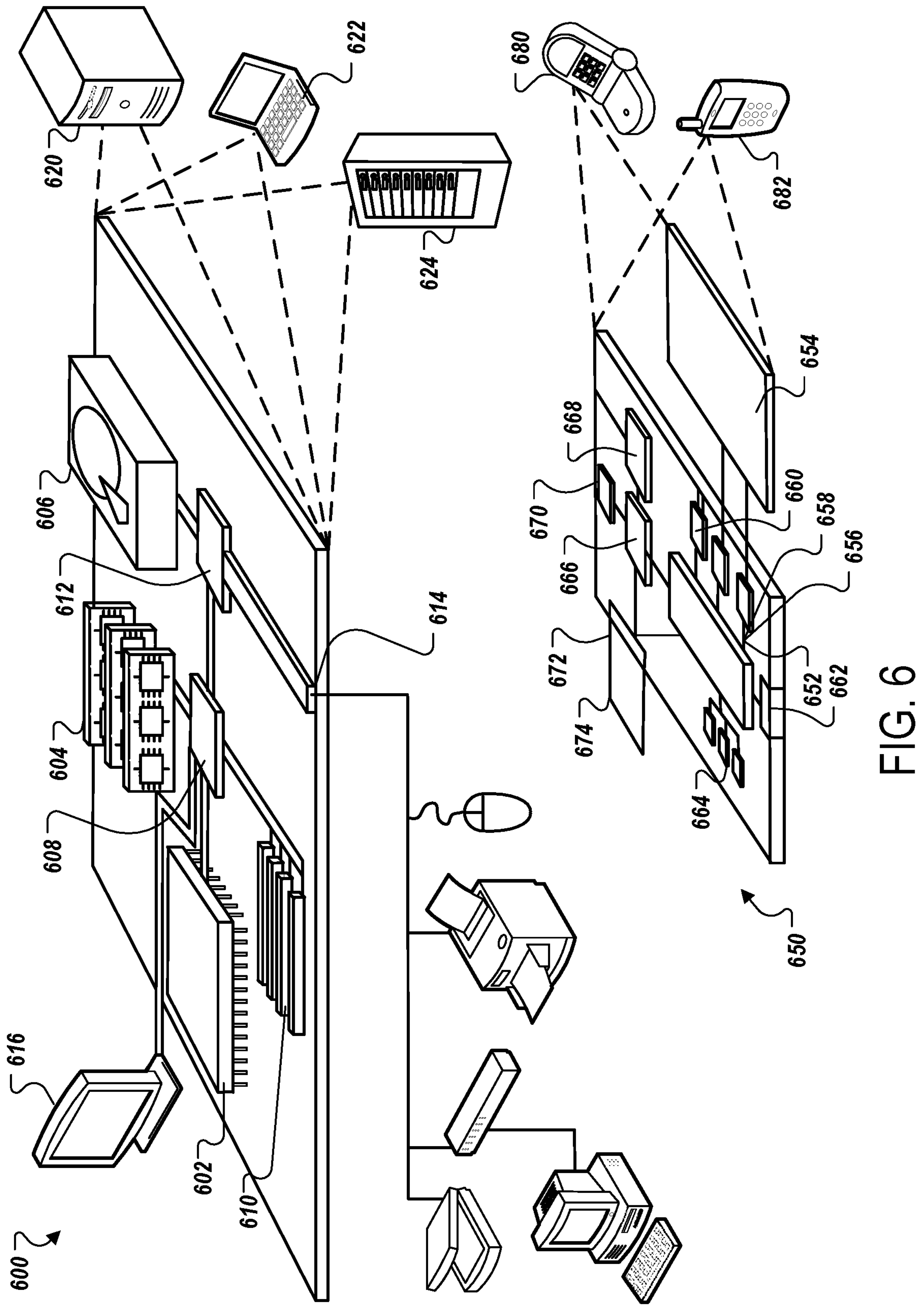
FIG. 6 is a diagram illustrating an example of a computing system used the object occlusion detection model.

FIG. 6 is a diagram illustrating an example of a computing system used for processing digital communications using a machine-learning network.

The computing system includes computing device 600 and a mobile computing device 650 that can be used to implement the techniques described herein. For example, one or more parts of an encoder machine-learning network system or a decoder machine-learning network system could be an example of the system 600 described here, such as a computer system implemented in any of the machine-learning networks, devices that access information from the machine-learning networks, or a server that accesses or stores information regarding the encoding and decoding performed by the machine-learning networks.

The computing device 600 is intended to represent various forms of digital computers, such as laptops desktops, workstations, personal digital assistants, servers, blade servers, mainframes, and other appropriate computers. The mobile computing device 650 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 600 includes a processor 602, a memory 604, a storage device 606, a high-speed Interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, graphic processing units (GPU) can be added into 600 and connected with 602 to perform numerical computations such as neural-network training. In some implementations, the processor 602 is a single threaded processor. In some implementations, the processor 602 is a multi-threaded processor. In some implementations, the processor 602 is a quantum computer.

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine readable mediums (for example, the memory 604, the storage device 606, or memory on the processor 602). The high-speed interface 608 manages bandwidth-intensive operations for the computing device 600, while the low-speed interface 612 manages lower bandwidth-intensive operations. Such allocation of functions is an example only. In some implementations, the high speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may include one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry in some cases. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 6G/6G cellular, among others. Such communication may occur, for example, through the transceiver 668 using a radio frequency. In addition, short-range communication may occur, such as using a Bluetooth, Wi-Fi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages; music files, among others) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, . . . this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method comprising:

obtaining, by one or more computers, a first feature set that represents a first image that depicts a first type of object, wherein the first feature set preserves spatial features of the first image;

providing, by the one or more computers, the obtained first feature set as an input to a first machine learning model that has been trained to process a feature set that preserves spatial features of an image depicting an object of the same object type as the first type of object and generate output data for each class of a plurality of different classes that each correspond to a particular spatial orientation of an object of the same object type as the first type of object, where first output data for each class represents a likelihood that an image represented by the first feature set depicts an object in a particular spatial orientation that corresponds to the class;

providing, by the one or more computers, the obtained first feature set as an input to a second machine learning model that has been trained to process a feature map corresponding to an image of any object type and generate output data that includes an occlusion likelihood, wherein the occlusion likelihood indicates a likelihood that an object depicted in an image represented by a feature set processed by the second machine learning model is at least partially occluded;

processing, by the one or more computers, the obtained first feature set through the first machine learning model to generate the first output data;

processing, by the one or more computers, the obtained first feature set through the second machine learning model to generate second output data, the second output data comprising an object occlusion map;

converting, by the one or more computers, the object occlusion map into a binary occlusion map, the binary occlusion map representing if an object of any type is occluding an object of the first type, wherein converting the object occlusion map into the binary occlusion map comprises:

comparing a positional occlusion likelihood score of the object occlusion map, representing a likelihood that a particular position is occluded, against a second predetermined threshold;

upon determining that the positional occlusion likelihood score exceeds the second predetermined threshold, marking the position in the binary occlusion map as a value that represents the position is occluded; and upon determining that the positional occlusion likelihood score does not exceed the second predetermined threshold, marking the position in the binary occlusion map as a value that represents the position is not occluded;

determining, by the one or more computers and based on the first output data and the second output data, a score that indicates a likelihood that the first image depicts an object of the first type that is at least partially occluded; and based on a determination that the determined score satisfies a first predetermined threshold, generating, by the one or more computers, third output data that includes an instruction indicating that an object of the first type that is at least partially occluded has been detected.

2. The method of claim 1, wherein the first machine learning model is a generative compositional model; and wherein the generative compositional model processes the first feature set to generate a second feature set as an output of the generative model.

3. The method of claim 1, wherein the second machine learning model is an object occlusion model; and wherein the object occlusion model comprises a model, trained by a plurality of input images with known occlusion, that is configured to generate occlusion output data, the occlusion output data indicating a measure of the likelihood that an object of any type is present, the object of any type being different from the object of the first type.

4. The method of claim 1, wherein the first output data is a likelihood map, the likelihood map including a score that a feature of an object depicted in the first image is represented in the first feature set; and wherein the object occlusion map comprises a score that represents a likelihood that an object of any type is present and occluding the object of the first type depicted in an input image.

5. The method of claim 4, wherein the method includes a step of combining the likelihood map with the object occlusion map to generate output score data for each class represented in the first output data.

6. The method of claim 5, wherein the output score data includes positional output score data on feature occlusion likelihood map, the feature occlusion likelihood map representing a plurality of positional scores that a feature is present and occluded at a corresponding position in the first image.

7. The method of claim 5, wherein the output score data includes a score value corresponding to each of a plurality of classes represented in a generative compositional model; and the score value represents the likelihood that each class represented in the generative compositional model is present depicted in the first feature set of the first input image.

8. The method of claim 7, the method comprises:

upon computing the score value for each class represented in the generative compositional model, selecting the maximum score value as the class being represented in the first feature set depicted in the first image, wherein the object occlusion map is associated with the maximum score.

9. A system comprising:

one or more computers; and one or more computer-readable media storing instructions that, when executed, cause the one or more computers to perform operations comprising:

obtaining, by the one or more computers, a first feature set that represents a first image that depicts a first type of object, wherein the first feature set preserves spatial features of the first image;

providing, by the one or more computers, the obtained first feature set as an input to a first machine learning model that has been trained to process a feature set that preserves spatial features of an image depicting an object of the same object type as the first type of object and generate output data for each class of a plurality of different classes that each correspond to a particular spatial orientation of an object of the same object type as the first type of object, where first output data for each class represents a likelihood that an image represented by the first feature set depicts an object in a particular spatial orientation that corresponds to the class;

providing, by the one or more computers, the obtained first feature set as an input to a second machine learning model that has been trained to process a feature map corresponding to an image of any object type and generate output data that includes an occlusion likelihood, wherein the occlusion likelihood indicates a likelihood that an object depicted in an image represented by a feature set processed by the second machine learning model is at least partially occluded;

processing, by the one or more computers, the obtained first feature set through the first machine learning model to generate the first output data;

processing, by the one or more computers, the obtained first feature set through the second machine learning model to generate second output data, the second output data comprising an object occlusion map;

converting, by one or more computers, the object occlusion map into a binary occlusion map, the binary occlusion map representing if an object of any type is occluding an object of the first type, wherein converting the object occlusion map into the binary occlusion map comprises:

comparing a positional occlusion likelihood score of the object occlusion map, representing a likelihood that a particular position is occluded, against a second predetermined threshold;

upon determining that the positional occlusion likelihood score exceeds the second predetermined threshold, marking the position in the binary occlusion map as a value that represents the position is occluded; and upon determining that the positional occlusion likelihood score does not exceed the second predetermined threshold, marking the position in the binary occlusion map as a value that represents the position is not occluded;

determining, by the one or more computers and based on the first output data and the second output data, a score that indicates a likelihood that the first image depicts an object of the first type that is at least partially occluded; and based on a determination that the determined score satisfies a first predetermined threshold, generating, by the one or more computers, third output data that includes an instruction indicating that an object of the first type that is at least partially occluded has been detected.

10. The system of claim 9, wherein the first machine learning model is a generative compositional model; and wherein the generative compositional model processes the first feature set to generate a second feature set as an output of the generative model.

11. The system of claim 9, wherein the second machine learning model is an object occlusion model; and wherein the object occlusion model comprises a model, trained by a plurality of input images with known occlusion, that is configured to generate occlusion output data, the occlusion output data indicating a measure of the likelihood that an object of any type is present, the object of any type being different from the object of the first type.

12. The system of claim 9, wherein the first output data is a likelihood map, the likelihood map including a score that a feature of an object depicted in the first image is represented in the first feature set; and wherein the object occlusion map comprises a score that represents a likelihood that an object of any type is present and occluding the object of the first type depicted in an input image.

13. The system of claim 12, wherein the operations comprise a step of combining the likelihood map with the object occlusion map to generate output score data for each class represented in the first output data.

14. The system of claim 13, wherein the output score data includes positional output score data on feature occlusion likelihood map, the feature occlusion likelihood map representing a plurality of positional scores that a feature is present and occluded at a corresponding position in the first image.

15. The system of claim 13, wherein the output score data includes a score value corresponding to each of a plurality of classes represented in a generative compositional model; and the score value represents the likelihood that each class represented in the generative compositional model is present depicted in the first feature set of the first input image.

16. The system of claim 15, the operations further comprise:

upon computing the score value for each class represented in the generative compositional model, selecting the maximum score value as the class being represented in the first feature set depicted in the first image, wherein the object occlusion map is associated with the maximum score.

17. A non-transitory computer-readable medium storing instructions that, when executed by one or more computers, cause the one or more computers to perform operations, comprising:

obtaining, by the one or more computers, a first feature set that represents a first image that depicts a first type of object, wherein the first feature set preserves spatial features of the first image;

providing, by the one or more computers, the obtained first feature set as an input to a first machine learning model that has been trained to process a feature set that preserves spatial features of an image depicting an object of the same object type as the first type of object and generate output data for each class of a plurality of different classes that each correspond to a particular spatial orientation of an object of the same object type as the first type of object, where first output data for each class represents a likelihood that an image represented by the first feature set depicts an object in a particular spatial orientation that corresponds to the class;

providing, by the one or more computers, the obtained first feature set as an input to a second machine learning model that has been trained to process a feature map corresponding to an image of any object type and generate output data that includes an occlusion likelihood, wherein the occlusion likelihood indicates a likelihood that an object depicted in an image represented by a feature set processed by the second machine learning model is at least partially occluded;

processing, by the one or more computers, the obtained first feature set through the first machine learning model to generate the first output data;

processing, by the one or more computers, the obtained first feature set through the second machine learning model to generate second output data, the second output data comprising an object occlusion map;

converting, by the one or more computers, the object occlusion map into a binary occlusion map, the binary occlusion map representing if an object of any type is occluding an object of the first type, wherein converting the object occlusion map into the binary occlusion map comprises:

comparing a positional occlusion likelihood score of the object occlusion map, representing a likelihood that a particular position is occluded, against a second predetermined threshold;

upon determining that the positional occlusion likelihood score exceeds the second predetermined threshold, marking the position in the binary occlusion map as a value that represents the position is occluded; and upon determining that the positional occlusion likelihood score does not exceed the second predetermined threshold, marking the position in the binary occlusion map as a value that represents the position is not occluded;

determining, by the one or more computers and based on the first output data and the second output data, a score that indicates a likelihood that the first image depicts an object of the first type that is at least partially occluded; and based on a determination that the determined score satisfies a first predetermined threshold, generating, by the one or more computers, third output data that includes an instruction indicating that an object of the first type that is at least partially occluded has been detected.

18. The computer-readable medium of claim 17, wherein the first machine learning model is a generative compositional model;

wherein the generative compositional model processes the first feature set to generate a second feature set as an output of the generative model;

wherein the second machine learning model is an object occlusion model; and wherein the object occlusion model comprises a model, trained by a plurality of input images with known occlusion, that is configured to generate occlusion output data, the occlusion output data indicating a measure of the likelihood that an object of any type is present, the object of any type being different from the object of the first type.

* * * * *